US012732604B2

(12) United States Patent
Xie

(10) Patent No.: US 12,732,604 B2
(45) Date of Patent: Sep. 8, 2026

(54) DECODING METHOD, ENCODING METHOD, AND STORAGE MEDIUM

(71) Applicant: GUANGDONG OPPO MOBILE TELECOMMUNICATIONS CORP., LTD., Dongguan (CN)

(72) Inventor: Zhihuang Xie, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 0 days.

(21) Appl. No.: 18/898,188

(22) Filed: Sep. 26, 2024

(65) Prior Publication Data

US 2025/0024027 A1 Jan. 16, 2025

Related U.S. Application Data

(63) Continuation of application No. PCT/CN2022/085898, filed on Apr. 8, 2022.

(51) Int. Cl.
*H04N 19/109* (2014.01)
*H04N 19/105* (2014.01)
(Continued)

(52) U.S. Cl.
CPC ......... *H04N 19/109* (2014.11); *H04N 19/105* (2014.11); *H04N 19/147* (2014.11); *H04N 19/176* (2014.11); *H04N 19/196* (2014.11)

(58) Field of Classification Search
CPC .. H04N 19/105; H04N 19/109; H04N 19/147; H04N 19/176; H04N 19/196
See application file for complete search history.

(56) References Cited

U.S. PATENT DOCUMENTS

2019/0166370 A1 5/2019 Xiu et al.
2021/0314618 A1 10/2021 Pfaff et al.
(Continued)

FOREIGN PATENT DOCUMENTS

AU 2019204437 A1 1/2021
CN 113940065 A 1/2022
(Continued)

OTHER PUBLICATIONS

WIPO, International Search Report and Written Opinion for International Application No. PCT/CN2022/085898, Nov. 17, 2022, 18 pages.
(Continued)

*Primary Examiner* — Jeremiah C Hallenbeck-Huber
(74) *Attorney, Agent, or Firm* — Sheppard, Mullin, Richter & Hampton LLP

(57) ABSTRACT

A decoding method, an encoding method, and a medium are provided. The decoding method includes the following. A bitstream is parsed to obtain a residual block of a current block. An optimal matrix based intra prediction (MIP) mode for predicting the current block is determined based on distortion costs corresponding to multiple MIP modes, where the distortion costs corresponding to the multiple MIP modes include distortion costs obtained by predicting samples in a template region adjacent to the current block in the multiple MIP modes. An intra prediction mode of the current block is determined based on the optimal MIP mode. The current block is predicted in the intra prediction mode of the current block, to obtain a prediction block of the current block. A reconstructed block of the current block is obtained based on the residual block of the current block and the prediction block of the current block.

16 Claims, 8 Drawing Sheets

(51) Int. Cl.

| | |
|---|---|
| ***H04N 19/147*** | (2014.01) |
| ***H04N 19/176*** | (2014.01) |
| ***H04N 19/196*** | (2014.01) |

(56) References Cited

U.S. PATENT DOCUMENTS

| | | | | |
|---|---|---|---|---|
| 2021/0392331 | A1* | 12/2021 | Pfaff | H04N 19/159 |
| 2022/0038741 | A1* | 2/2022 | Nam | H04N 19/70 |
| 2022/0060751 | A1* | 2/2022 | Nam | H04N 19/12 |
| 2022/0116606 | A1* | 4/2022 | Pfaff | H04N 19/593 |
| 2022/0224913 | A1* | 7/2022 | Wang | H04N 19/593 |
| 2022/0279187 | A1* | 9/2022 | Sim | H04N 19/157 |
| 2024/0236354 | A1 | 7/2024 | Wang et al. | |
| 2024/0388731 | A1 | 11/2024 | Deng et al. | |
| 2025/0030845 | A1* | 1/2025 | Xie | H04N 19/147 |
| 2025/0133236 | A1 | 4/2025 | Xie | |

FOREIGN PATENT DOCUMENTS

| | | | |
|---|---|---|---|
| CN | 113950832 | A | 1/2022 |
| WO | 2021004153 | A1 | 1/2021 |

OTHER PUBLICATIONS

Pfaff et al., "CE3: Affine linear weighted intra prediction (CE3-4.1, CE3-4.2)", Fraunhofer HHI, Document: JVET-N0217, Joint Video Experts Team (JVET) of ITU-T SG 16 WP 3 and ISO/IEC JTC 1/SC 29/WG 11 14th Meeting: Geneva, CH, Mar. 19-27, 2019, 17 pages.

Bross et al., "Versatile Video Coding Editorial Refinements on Draft 10", Editors, Document: JVET-T2001-v2, Joint Video Experts Team (JVET) of ITU-T SG 16 WP 3 and ISO/IEC JTC 1/SC 29 20th Meeting, by teleconference, Oct. 7-16, 2020, 511 pages.

Chen et al., "Algorithm description for Versatile Video Coding and Test Model 11 (VTM 11)", Editors, Document: JVET-T2002-v2, Joint Video Experts Team (JVET) of ITU-T SG 16 WP 3 and ISO/IEC JTC 1/SC 29 20th Meeting, by teleconference, Oct. 7-16, 2020, 101 pages.

Zhang Ziqiu et al. "Improving VVC Intra Coding via Probability Estimation and Fusion of Multiple Prediction Modes" pp. 654-664, dated Sep. 30, 2021, 11 pages.

Extended European search report issued in corresponding European application No. 22936191.0 dated Jan. 14, 2026, 14 pages.

Cao, Keming, et al. "EE2-related: Fusion for template-based intra mode derivation", Joint Video Experts Team (JVET) of ITU-T SG16 WP3 and ISO/IEC JTC 1/SC 29, 23rd meeting, by teleconference, Document: JVET-W0123-v1, dated Jul. 7-16, 2021, (Qualcomm), 4 pages.

Extended European search report issued in corresponding European application No. 22936192.8 dated Jan. 14, 2026, 14 pages.

WIPO, International Search Report and Written Opinion for International Application No. PCT/CN2022/085897, Nov. 15, 2022. 21 pages (with English translation).

The first office action issued in corresponding RU application No. 2024133297 dated Feb. 20, 2025. 14 pages. (with English translation).

The second office action issued in corresponding RU application No. 2024133297 dated Jun. 26, 2025. 10 pages. (with English translation).

* cited by examiner

600
ENCODER
610
PREDICTION UNIT
620
RESIDUAL UNIT
630
ENCODING UNIT

DECODING METHOD, ENCODING METHOD, AND STORAGE MEDIUM

CROSS-REFERENCE TO RELATED APPLICATION(S)

This application is a continuation of International Application No. PCT/CN2022/085898, filed Apr. 8, 2022, the disclosure of which is hereby incorporated by reference in its entirety.

TECHNICAL FIELD

This disclosure relates to the field of video coding, and in particular to a decoding method, an encoding method, and a storage medium.

BACKGROUND

Digital video compression technology mainly involves compressing a huge amount of digital picture video data, so as to facilitate transmission, storage, or the like. With the surge of internet video and higher requirements for video clarity, although a video decompression technology can be realized with existing digital video compression standards, at present, there is still a need for better digital video compression technology to improve compression efficiency.

SUMMARY

In a first aspect, a decoding method is provided in the present disclosure. The decoding method includes the following. A bitstream is parsed to obtain a residual block of a current block. An optimal matrix based intra prediction (MIP) mode for predicting the current block is determined based on distortion costs corresponding to multiple MIP modes, where the distortion costs corresponding to the multiple MIP modes include distortion costs obtained by predicting samples in a template region adjacent to the current block in the multiple MIP modes. An intra prediction mode of the current block is determined based on the optimal MIP mode. The current block is predicted in the intra prediction mode of the current block, to obtain a prediction block of the current block. A reconstructed block of the current block is obtained based on the residual block of the current block and the prediction block of the current block.

In a second aspect, an encoding method is provided in the present disclosure. The encoding method includes the following. An optimal MIP mode for predicting a current block is determined based on distortion costs corresponding to multiple MIP modes, where the distortion costs corresponding to the multiple MIP modes include distortion costs obtained by predicting samples in a template region adjacent to the current block in the multiple MIP modes. An intra prediction mode of the current block is determined based on the optimal MIP mode. The current block is predicted in the intra prediction mode of the current block, to obtain a prediction block of the current block. A residual block of the current block is obtained based on the prediction block of the current block and an original block of the current block. The residual block of the current block is encoded to obtain a bitstream.

In a third aspect, a computer-readable storage medium is provided in the present disclosure. The computer-readable storage medium stores a bitstream. The bitstream is generated according to the method of the second aspect.

DETAILED DESCRIPTION

Figure 1:
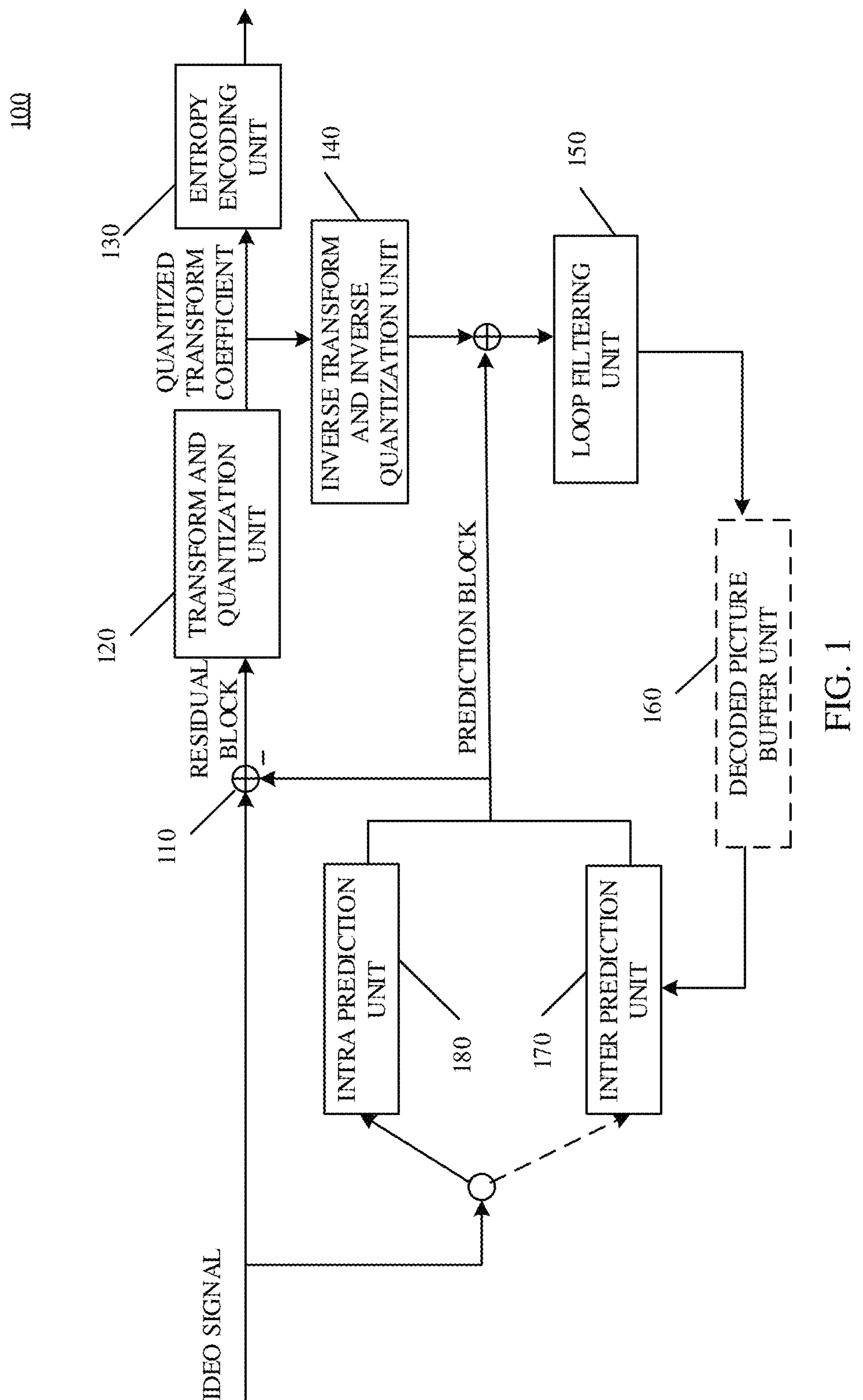
FIG. 1 is a schematic block diagram of an encoding framework provided in embodiments of the present disclosure.

The following will describe technical solutions of embodiments of the present disclosure with reference to accompanying drawings.

Solutions of embodiments of the present disclosure are applicable to the technical field of digital video coding, including but not limited to picture coding, video coding, hardware video coding, dedicated circuit video coding, real-time video coding, etc. In addition, the solutions of embodiments of the present disclosure can be incorporated into audio video coding standards (AVS), AVS 2, or AVS 3. For example, the AVS includes, but is not limited to, H.264/audio video coding (AVC) standard, H.265/high efficiency video coding (HEVC) standard, and H.266/versatile video coding (VVC) standard. Furthermore, the solutions of embodiments of the present disclosure can be used for performing lossy compression or lossless compression on a picture. The lossless compression can be visually lossless compression or mathematically lossless compression.

A block-based hybrid coding framework is generally used in video coding standards. Each picture of a video is partitioned into largest coding units (LCUs) or coding tree units (CTUs), which are squares of equal size (e.g., 128×128, 64×64, etc.). Each LCU or CTU can be partitioned into rectangular coding units (CUs) according to certain rules. Furthermore, the CU can also be partitioned into prediction units (PUs), transform units (TUs), etc. The hybrid coding framework can include modules such as prediction, transform, quantization, entropy coding, and loop filter. The prediction module includes intra prediction and inter prediction, and the inter prediction includes motion estimation and motion compensation. Since there is a strong correlation among neighbouring samples in a video picture, using intra prediction in video coding can eliminate spatial redundancy between neighbouring samples. The intra prediction only refers to picture information of a same picture to predict sample information of a current partitioned block. Moreover, since there is also a strong similarity between neighbouring pictures in the video, using inter prediction in video coding can eliminate temporal redundancy between neighbouring pictures, thereby improving coding efficiency. The inter prediction can refer to picture information of different pictures and use motion estimation to search motion vector information that best matches the current partitioned block. For the transform, a predicted picture block is transformed into a frequency domain, redistributing energy. Combined with the quantization, information that is not sensitive to human eyes is removed, thereby eliminating visual redundancy. The entropy coding can eliminate character redundancy according to a current context model and probability information of a binary bitstream.

In a digital video encoding process, an encoder reads a black-and-white picture or a colour picture from an original picture sequence, and then encodes the black-and-white picture or the colour picture. The black-and-white picture can include samples of luma components, and the colour picture can include samples of chroma components. Optionally, the colour picture can also include samples of luma components. A colour format of the original picture sequence can be a luma-chroma (YCbCr, YUV) format or a red-green-blue (RGB) format, etc. Specifically, after the encoder reads the black-and-white picture or the colour picture, the encoder partitions the black-and-white picture or the colour picture into blocks respectively. A prediction block of a current block is generated by performing intra prediction or inter prediction on the current block. A residual block is obtained by subtracting the prediction block from an original block of the current block. A quantization coefficient matrix is obtained by performing transform and quantization on the residual block. The quantization coefficient matrix is encoded into a bitstream by entropy encoding. In a digital video decoding process, at a decoding end, the prediction block of the current block is generated by performing intra prediction or inter prediction on the current block. Moreover, the quantization coefficient matrix is obtained by parsing the bitstream, the residual block is obtained by performing inverse quantization and inverse transformation on the quantization coefficient matrix, and the reconstructed block is obtained by adding the prediction block and the residual block. The reconstructed blocks can form a reconstructed picture. A decoded picture is obtained by performing loop filtering on the reconstructed picture on a picture basis or on a block basis.

The current block can also be a current CU or a current PU.

It can be noted that similar operations for obtaining the decoded picture are also needed at an encoding end. The decoded picture can be a reference picture of a subsequent picture for inter prediction. Block partition information determined at the encoding end, as well as mode information or parameter information for prediction, transformation, quantization, entropy coding, loop filtering, etc., are carried in the bitstream when necessary. The decoding end parses the bitstream and analyzes existing information to determine the block partition information, as well as the mode information or the parameter information for prediction, transformation, quantization, entropy coding, loop filtering, etc. the same as such information at the encoding end, so as to ensure that the decoded picture obtained by the encoding end is the same as the decoded picture obtained by the decoding end. The decoded picture obtained by the encoding end is also referred to as "reconstructed picture". The current block can be partitioned into PUs during prediction, the current block can be partitioned into transform units (TUs) during transform, and partition of PUs can be different from partition of TUs. Certainly, the above is a basic process of the video encoder and the video decoder under the block-based hybrid coding framework. With the development of technology, some modules or steps of the framework or process can be optimized. The present disclosure is applicable to the basic process of the video encoder and the video decoder under the block-based hybrid coding framework.

For ease of understanding, the following will give a brief introduction to an encoding framework provided in the present disclosure.

FIG. 1 is a schematic block diagram of an encoding framework 100 provided in embodiments of the present disclosure.

As illustrated in FIG. 1, the encoding framework 100 can include an intra prediction unit 180, an inter prediction unit 170, a residual unit 110, a transform and quantization unit 120, an entropy encoding unit 130, an inverse transform and inverse quantization unit 140, and a loop filtering unit 150. Optionally, the encoding framework 100 can also include a decoded picture buffer unit 160. The encoding framework 100 can also be referred to as "hybrid frame encoding mode".

The intra prediction unit 180 or the inter prediction unit 170 can predict a picture block to-be-encoded to output a prediction block. The residual unit 110 can calculate a residual block, i.e., a difference between the prediction block and the picture block to-be-encoded, based on the prediction block and the picture block to-be-encoded. The transform and quantization unit 120 is configured to perform transform and quantization on the residual block to remove information that is not sensitive to the human eye, thereby eliminating visual redundancy. Optionally, the residual block before being transformed and quantized by the transform and quantization unit 120 can be referred to as "temporal residual block", and a temporal residual block after being transformed and quantized by the transform and quantization unit 120 can be referred to as "frequency residual block" or "frequency-domain residual block". The entropy encoding unit 130 receives quantized transform coefficients output by the transform and quantization unit 120, and can output a bitstream based on the quantized transform coefficients. For example, the entropy encoding unit 130 can eliminate character redundancy according to a target context model and probability information of a binary bitstream. For example, the entropy encoding unit 130 is configured to implement context-based adaptive binary arithmetic coding (CABAC). The entropy encoding unit 130 is also referred to as "header information encoding unit". Optionally, in the present disclosure, the picture block to-be-encoded can also be referred to as "original picture block" or "target picture block". The prediction block can also be referred to as "predicted picture block" or "picture prediction block", and can also be referred to as "prediction signal" or "prediction information". The reconstructed block can also be referred to as "reconstructed picture block" or "picture reconstruction block", and can also be referred to as "reconstructed signal" or "reconstructed information". Furthermore, for an encoding end, the picture block to-be-encoded can also be referred to as "encoding block" or "encoding picture block"; and for a decoding end, the picture block to-be-decoded can also be referred to as "decoding block" or "decoding picture block". The picture block to-be-encoded can be a CTU or a CU.

The encoding framework 100 calculates a residual between the prediction block and the picture block to-be-encoded to obtain the residual block, the residual block is transformed, quantized, etc., and then transmitted to the decoder. Correspondingly, after the decoder receives and parses the bitstream, the decoder performs inverse transformation and inverse quantization to obtain the residual block, and then superimposes the residual block on the prediction block obtained through prediction by the decoder to obtain the reconstructed block.

It can be noted that in the encoding framework 100, the inverse transform and inverse quantization unit 140, the loop filtering unit 150, and the decoded picture buffer unit 160 can be configured to form a decoder. In other words, the intra prediction unit 180 or the inter prediction unit 170 can predict the picture block to-be-encoded based on an existed reconstructed block, so that the encoding end uses a reference frame in the same way as the decoding end. In other words, the encoder can replicate a processing loop of the decoder and thus can generate the same prediction as the decoding end. Specifically, the quantized transform coefficients are inversely transformed and inversely quantized by the inverse transform and inverse quantization unit 140 to replicate an approximate residual block at the decoding end. The approximate residual block plus the prediction block can then be processed by the loop filtering unit 150 to smoothly filter out effects such as blocking due to block-based processing and quantization. The picture block output from the loop filtering unit 150 can be stored in the decoded picture buffer unit 160 for the prediction of subsequent pictures.

It can be understood that FIG. 1 is only an example of the present disclosure and cannot be construed as a limitation to the present disclosure.

For example, the loop filtering unit 150 in the encoding framework 100 can include a deblocking filter (DBF) and a sample adaptive offset (SAO). The DBF has a function of deblocking, and the SAO has a function of deringing. In other embodiments of the present disclosure, a neural network-based loop filtering algorithm can be used for the encoding framework 100 to improve video compression efficiency. Alternatively, the encoding framework 100 can be a video encoding hybrid framework based on a deep learning neural network. In an embodiment, a convolutional neural network (CNN)-based model can be used based on the DBF and the SAO to calculate a result after sample filtering. The loop filtering unit 150 can have the same or different network structure in a luma component and in a chroma component.

Considering that the luma component contains more visual information, the luma component can also be used for guiding the filtering of the chroma component, thereby improving the reconstruction quality of the chroma component.

The following will introduce contents related to intra prediction.

For intra prediction, the intra prediction only refers to information of a same picture to predict sample information of the picture block to-be-encoded, thereby eliminating spatial redundancy. A frame used for intra prediction can be an I-frame. For example, according to an encoding order from the left to the right and from the top to the bottom, the picture block to-be-encoded can be predicted by taking a top-left picture block, a top picture block, and a left picture block as reference information, and the picture block to-be-encoded is also used as reference information of a subsequent picture block. In this way, the whole picture can be predicted. If an input digital video is in a colour format, such as a YUV 4:2:0 format, every 4 pixels of each picture in the digital video have 4 Y components and 2 UV components, and the encoding framework 100 can encode the Y components (i.e., luma block) and the UV components (i.e., chroma block) respectively. Similarly, the decoder can also decode correspondingly according to the format.

Other intra prediction modes involved in the present disclosure will be described below.

(1) Matrix Based Intra Prediction (MIP) Mode

Processes involved in the MIP mode can include three main operations, which are a down-sampling process, a matrix multiplication process, and an up-sampling process respectively. Specifically, spatial neighbouring reconstructed samples are down-sampled firstly through the down-sampling process. Then, a sample sequence after down-sampling is used as an input vector of the matrix multiplication process, i.e., an output vector of the down-sampling process is used as the input vector of the matrix multiplication process, the input vector of the matrix multiplication process is then multiplied with a preset matrix and added with a bias vector, and a sample vector after calculation is output. Finally, an output vector of the matrix multiplication process is used as an input vector of the up-sampling process, and a final prediction block is obtained by up-sampling.

Figure 2:
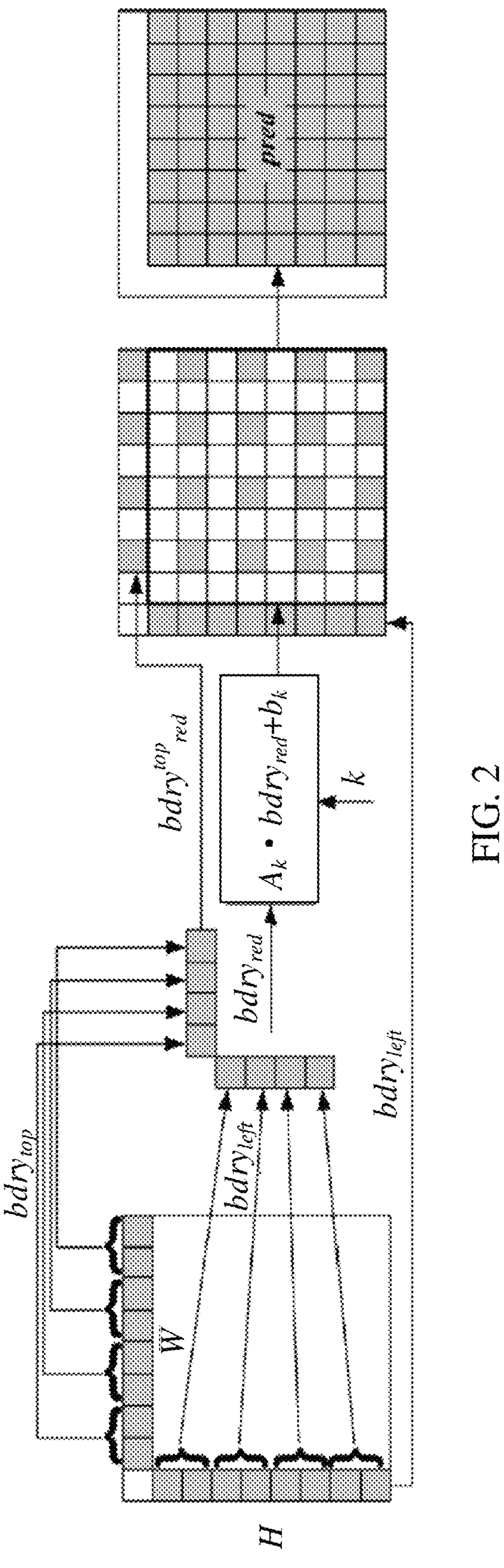
FIG. 2 is a schematic diagram of a matrix based intra prediction (MIP) mode provided in embodiments of the present disclosure.

FIG. 2 is a schematic diagram of an MIP mode provided in embodiments of the present disclosure.

As illustrated in FIG. 2, for the MIP mode, in the down-sampling process, a down-sampled top neighbouring reconstructed sample vector $bdry_{top}$ is obtained by averaging top neighbouring reconstructed samples of a current CU, and a down-sampled left neighbouring reconstructed sample vector $bdry_{left}$ is obtained by averaging left neighbouring reconstructed samples of the current CU. After $bdry_{top}$ and $bdry_{left}$ are obtained, $bdry_{top}$ and $bdry_{left}$ are used as an input vector $bdry_{red}$ of the matrix multiplication process. Specifically, a sample vector can be obtained based on a top-row vector $bdry^{top}_{red}$ of $bdry_{red}$, $bdry_{left}$, and $A_k bdry_{red}+b_k$, where $A_k$ is a preset matrix, $b_k$ is a preset bias vector, and k is an index of the MIP mode. After the sample vector is obtained, the sample vector is up-sampled through linear interpolation to obtain a predicted sample block, where the number of samples in the predicted sample block is consistent with the actual number of samples of the CU.

In other words, in order to predict a block with a width of W and a height of H, H reconstructed samples in a left column of the current block and W reconstructed samples in a top row of the current block are needed as inputs for the MIP. A prediction block in the MIP is mainly generated based on three operations: reference samples averaging, matrix vector multiplication, and interpolation. A core of MIP is matrix vector multiplication which can be regarded as a process of generating the prediction block from input samples (reference samples) in a matrix vector multiplication. A variety of matrixes are provided in the MIP, different matrixes have different prediction methods, and same input samples will have different results using different matrixes. The process of reference samples averaging and interpolation is a compromise design between performance and complexity. For a larger block, reference sample averaging can be performed to achieve an approximate down-sampling effect, so that the input can be adapted to a smaller matrix, while interpolation achieves an up-sampling effect. In this way, there is no need to provide an MIP matrix for the block of each size, but only matrices with one or more specific sizes are provided. As the increasing need for compression performance and improvement of hardware capabilities, a more complex MIP can appear in a next generation of standards.

For an MIP mode, the MIP mode can be simplified from a neural network. For example, a matrix used in the MIP mode can be obtained through training. Therefore, the MIP mode has a strong generalization capability and a prediction effect not achieved by a traditional prediction mode. The MIP mode can be a model obtained through a number of complexity simplifications in hardware and software on a neural network-based intra prediction mode. On the basis of a large number of training samples, multiple prediction modes indicate multiple models and parameters, which can better cover the texture of a natural sequence.

The MIP mode is somewhat similar to a planar mode, but clearly, the MIP mode is more complex and flexible than the planar mode.

It can be noted that the number of MIP modes varies for CUs of different block sizes. Exemplarily, the MIP mode has 16 prediction modes for a 4×4-sized CU. The MIP mode has 8 prediction modes for an 8×8-sized CU or a CU with a width or height equal to 4. The MIP mode has 6 prediction modes for CUs of other sizes. Moreover, the MIP mode has a transpose function. For a prediction mode that matches the current size, in the MIP mode, transpose calculations can be tried at the encoding end. Therefore, the MIP mode needs a flag for indicating whether the MIP mode is used for the current CU, and if the MIP mode is used for the current CU, a transpose flag is also needed to be transmitted to the decoder.

The transpose flag of the MIP is binarized by fixed length (FL), with a length of 1, while an index of the MIP mode is binarized by truncated binary (TB) encoding.

(2) Template Based Intra Mode Derivation (TIMD) Prediction Mode

For the TIMD prediction mode, both the encoder and decoder use the same operations to derive the prediction mode to reduce the overhead of transmitting mode indexes. The TIMD prediction mode can be understood as two main parts. Firstly, cost information of each prediction mode is calculated according to a template. A prediction mode corresponding to the minimum cost and a prediction mode corresponding to the second-minimum cost are selected. The prediction mode corresponding to the minimum cost is denoted as prediction mode 1, and the prediction mode corresponding to the second-minimum cost is denoted as prediction mode 2. If a ratio of the second-minimum cost (costMode2) to the minimum cost (costMode1) satisfies a preset condition, such as costMode2<2*costMode1, weighted fusion is performed on a prediction block corresponding to prediction mode 1 and a prediction block corresponding to prediction mode 2 according to a weight corresponding to prediction mode 1 and a weight corresponding to prediction mode 2, so as to obtain a final prediction block.

Exemplarily, the weight corresponding to prediction mode 1 and the weight corresponding to the prediction mode 2 are determined according to the following manner:

weight1=costMode2/(costMode1+costMode2); and weight2=1−weight1;

where weight1 indicates the weight for the prediction block corresponding to prediction mode 1, and weight2 indicates the weight for the prediction block corresponding to prediction mode 2. However, if the ratio of the second-minimum cost (costMode2) to the minimum cost (costMode1) does not satisfy the preset condition, the weighted fusion on the prediction blocks is not performed, and the prediction block corresponding to prediction mode 1 is taken as the TIMD prediction block.

It can be noted that when the TIMD prediction mode is used for performing intra prediction on the current block, if no available neighbouring reconstructed sample is included in a reconstructed-sample template of the current block, in the TIMD prediction mode, the planar mode is selected for performing intra prediction on the current block, i.e., the weighted fusion is not performed. Similar to the DIMD prediction mode, in the TIMD prediction mode, a flag needs to be transmitted to the decoder for indicating whether the TIMD prediction mode is used for the current CU.

The encoder or the decoder calculates the cost information of each prediction mode as follows. Intra prediction is performed on samples in a template region according to reconstructed samples adjacent to the top or the left of the template region, and the prediction process is the same as that of an original intra prediction mode. For example, when intra prediction is performed on the samples in the template region in a DC mode, an average of the whole CU is calculated. For another example, when the intra prediction is performed on the samples in the template region in an angle prediction mode, a corresponding interpolation filter is selected according to the mode, and predicted samples are obtained by interpolation according to the rules. In this case, the distortion between the predicted samples and the reconstructed samples in the template region, i.e., the cost information of the current prediction mode, can be calculated according to the predicted samples and the reconstructed samples in the template region.

Figure 3:
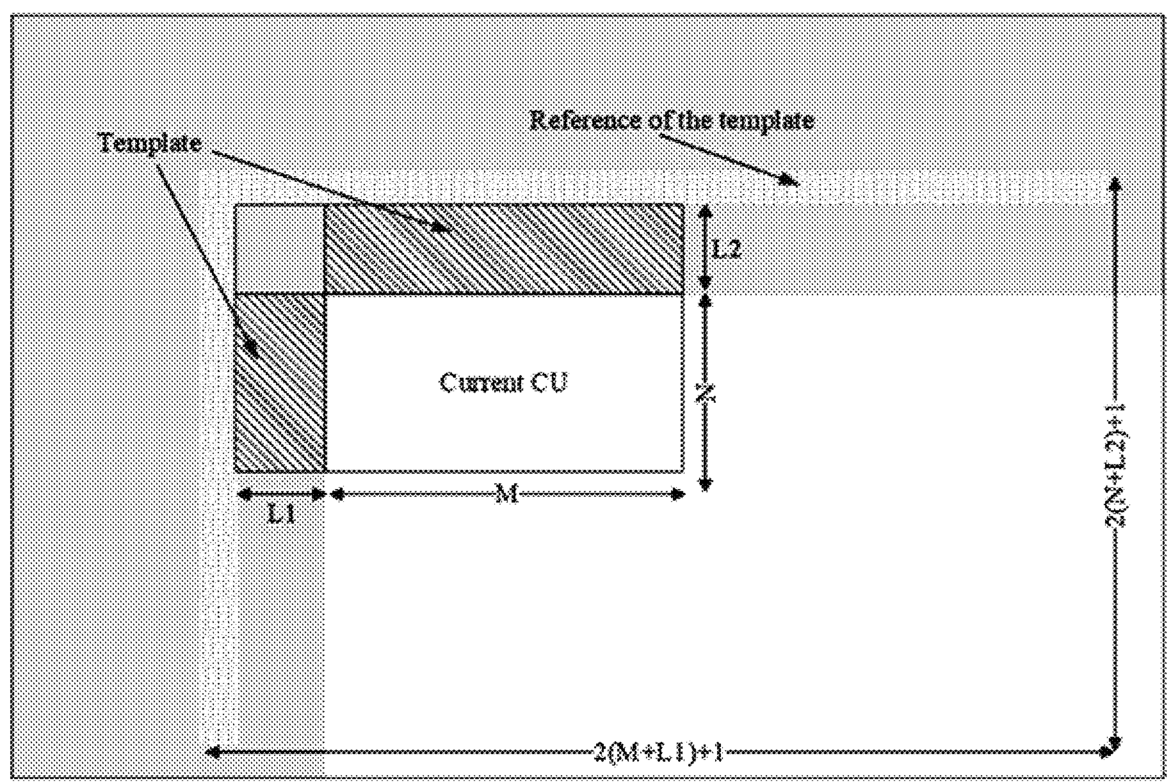
FIG. 3 is a schematic diagram illustrating a template used in template based intra mode derivation (TIMD) provided in embodiments of the present disclosure.

FIG. 3 is a schematic diagram of a template used in TIMD provided in embodiments of the present disclosure.

As illustrated in FIG. 3, if the current block is a CU with a width equal to M and a height equal to N, the encoder and the decoder can select reconstructed samples in a reference of template of the current block based on a CU with a width equal to 2 (M+/1)+1 and a height equal to 2 (N+1.2)+1, to predict samples in the template region of the current block. Certainly, if no available neighbouring reconstructed sample is included in the template region of the current block, in the TIMD prediction mode, the planar mode is selected for performing intra prediction on the current block. For example, the available neighbouring reconstructed samples can be samples adjacent to the left and the top of the current CU in FIG. 3, i.e., no available reconstructed samples are present in regions padded with oblique lines. In other words, if there is no available reconstructed sample in the regions padded with oblique lines, in the TIMD prediction mode, the planar mode is selected to perform intra prediction on the current block.

It can be noted that except for the boundary case, when the current block is encoded and decoded, theoretically, reconstructed values can be obtained at the left and the top of the current block, that is, available neighbouring reconstructed samples are included in the template of the current block. In a specific implementation, the decoder can predict the template in a certain intra prediction mode, and compare a prediction value with a reconstructed value to obtain a cost of the intra prediction mode in the template, for example, a sum of absolute difference (SAD), a sum of absolute transformed difference (SATD), and a sum of squared error (SSE). Since the template is adjacent to the current block, the reconstructed samples in the template have a correlation with samples in the current block. Therefore, a prediction mode used for the template can be used to estimate the prediction mode used for the current block. In the TIMD, the template is predicted in some candidate intra prediction modes to obtain costs of the candidate intra prediction modes in the template, and prediction values in one or two intra prediction modes with the lowest costs are taken as intra prediction values of the current block. If a difference in two costs corresponding to the two intra prediction modes in the template is small, weighted average is performed on prediction values of the two intra prediction modes, to improve the compression performance. Optionally, weights of the prediction values of the two prediction modes are related to the costs, for example, the weights are inversely proportional to the costs.

To summarize, in the TIMD, the intra prediction modes are selected according to prediction effects of the intra prediction modes in the template, and the two intra prediction modes are weighted according to the costs in the template. The advantage of the TIMD is that if the TIMD mode is selected for the current block, there is no need to indicate which intra prediction mode is used in the bitstream, but it is derived by the decoder itself through the above process, thereby saving overhead to a certain extent.

Figure 4:
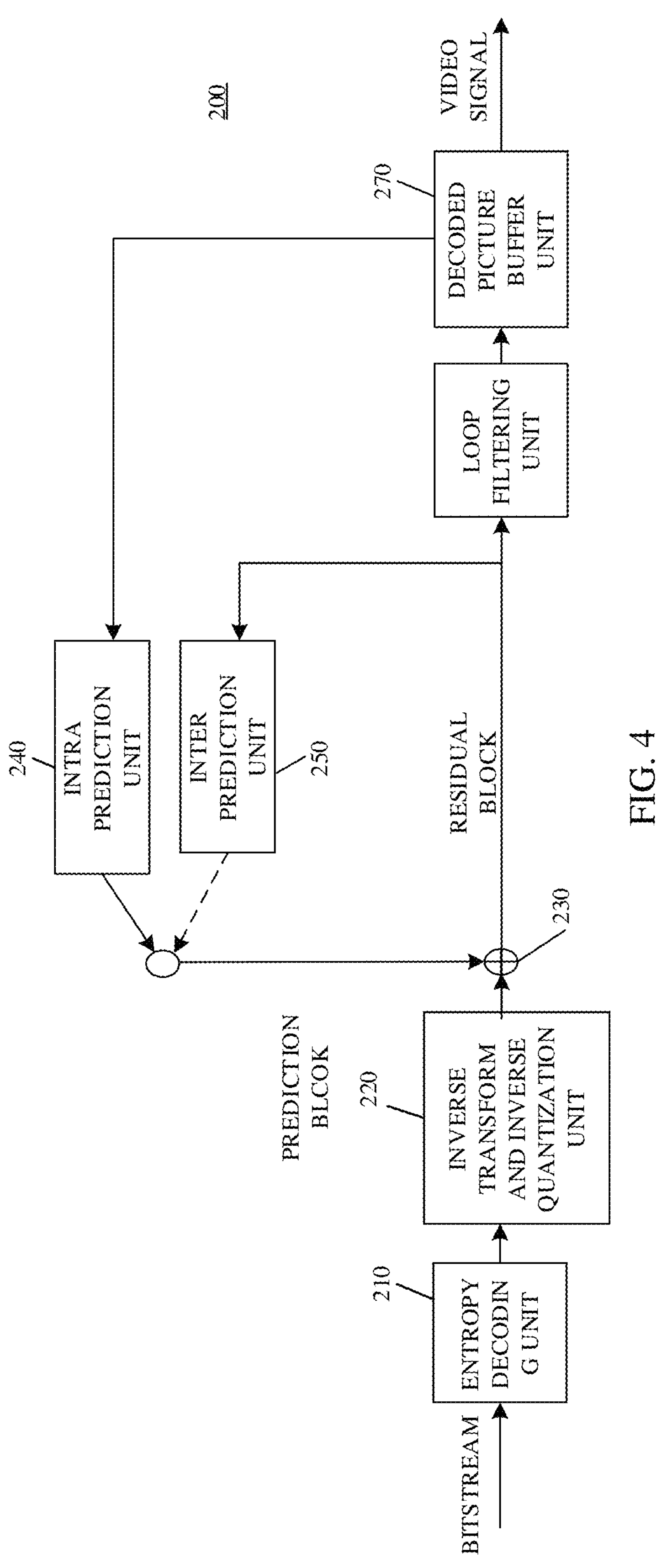
FIG. 4 is a schematic block diagram of a decoding framework provided in embodiments of the present disclosure.

FIG. 4 is a schematic block diagram of a decoding framework 200 provided in embodiments of the present disclosure.

As illustrated in FIG. 4, the decoding framework 200 can include an entropy decoding unit 210, an inverse transform and inverse quantization unit 220, a residual unit 230, an intra prediction unit 240, an inter prediction unit 250, a loop filtering unit 260, and a decoded picture buffer unit 270.

The entropy decoding unit 210 receives and parses a bitstream to obtain a prediction block and a frequency-domain residual block, and the frequency-domain residual block is inversely transformed and inversely quantized by the inverse transform and inverse quantization unit 220 to obtain a temporal residual block. The residual unit 230 superimposes a prediction block obtained by the intra prediction unit 240 or the inter prediction unit 250 to the temporal residual block obtained after performing inverse transformation and inverse quantization by the inverse transformation and inverse quantization unit 220, to obtain a reconstructed block. For example, the intra prediction unit 240 or the inter prediction unit 250 can obtain the prediction block by decoding header information of the bitstream.

Figure 5:
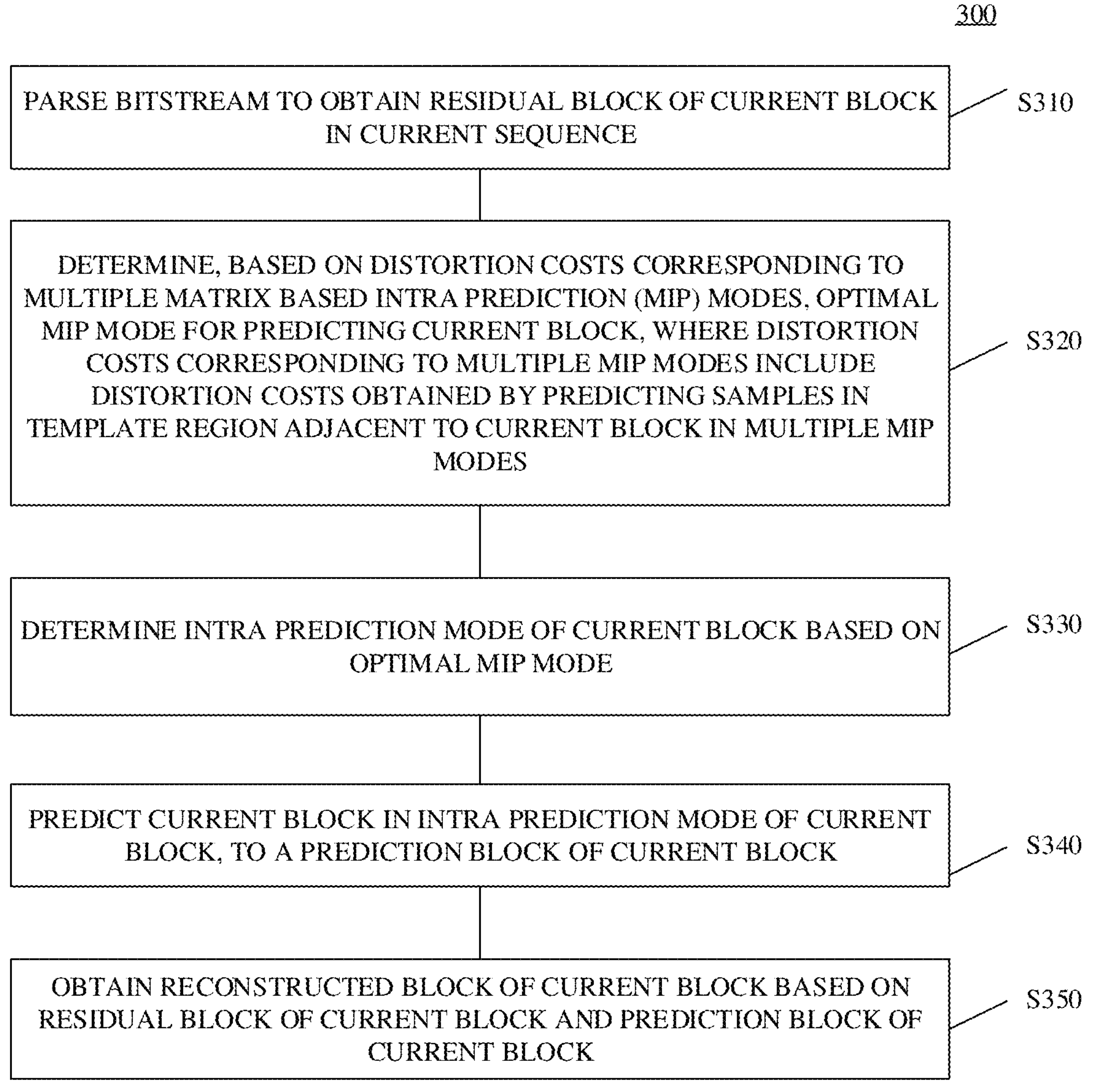
FIG. 5 is a schematic flowchart of a decoding method provided in embodiments of the present disclosure.

FIG. 5 is a schematic flowchart of a decoding method 300 provided in embodiments of the present disclosure. It can be understood that the decoding method 300 can be performed by a decoder. For example, the decoding method 300 is applicable to the decoding framework 200 illustrated in FIG. 4. For ease of description, the decoder is illustrated below as an example.

As illustrated in FIG. 5, the decoding method 300 can include some or all of the following.

- S310, the decoder parses a bitstream to obtain a residual block of a current block in a current sequence.
- S320, the decoder determines an optimal MIP mode for predicting the current block based on distortion costs corresponding to multiple MIP modes, where the distortion costs corresponding to the multiple MIP modes include distortion costs obtained by predicting samples in a template region adjacent to the current block in the multiple MIP modes.
- S330, the decoder determines an intra prediction mode of the current block based on the optimal MIP mode.
- S340, the decoder predicts the current block in the intra prediction mode of the current block, to obtain a prediction block of the current block.
- S350, the decoder obtains a reconstructed block of the current block based on the residual block of the current block and the prediction block of the current block.

Exemplarily, in the present disclosure, the operations at S320 to S330 (i.e., a process in which the decoder determines the optimal MIP mode based on the distortion costs corresponding to the multiple MIP modes and determines the intra prediction mode of the current block based on the optimal MIP mode) can also be referred to as "template matching MIP (TMMIP) technology" or "TMMIP-based prediction mode derivation method". In other words, after the residual block of the current block is obtained by the decoder, the decoder can determine the intra prediction mode of the current block based on the TMMIP technology, and predict the current block in the intra prediction mode of the current block, to obtain the prediction block of the current block. Finally, the decoder can obtain the reconstructed block of the current block based on the residual block of the current block and the prediction block of the current block.

In the embodiment, in determining the intra prediction mode of the current block, the decoder determines the optimal MIP mode for predicting the current block based on the distortion costs corresponding to the multiple MIP modes, and determines the intra prediction mode of the current block based on the optimal MIP mode. In this way, the decoder can obtain the MIP mode without parsing the bitstream. Compared with traditional MIP technologies, in the present disclosure, bit overhead at a CU level can be effectively reduced, thereby improving decompression efficiency.

In other words, the traditional MIP technologies need more bit overhead than other intra prediction tools. The traditional MIP technologies not only need a flag to indicate whether the MIP technology is used, but also need a flag to indicate whether the MIP is transposed. In addition, the traditional MIP technologies also need to use TB encoding to indicate the MIP prediction mode, which needs the largest overhead. The MIP technology is simplified from neural network and is quite different from the traditional interpolation filtering prediction technology. For some special textures, the MIP prediction mode works better than the traditional intra prediction mode, but the MIP technology has a deficiency of requiring relatively large flag overhead. For example, for the 4×4-sized CU, there are 16 predicted samples in total, but it requires bit overhead on one MIP usage flag, one MIP transpose flag, a TB flag of five or six bits. Therefore, in the present disclosure, the decoder autonomously determines the optimal MIP mode for predicting the current block, and determines the intra prediction mode for the current block in the optimal MIP mode, which can save up to five or six bits of overhead and effectively reduces bit overhead at the CU level, thereby improving decompression efficiency.

In short, according to the solutions provided in the present disclosure, the defect of the traditional MIP technology can be solved, that is, the bit overhead at the picture block level can be reduced, thereby improving the decompression efficiency.

Beneficial effects of the solutions provided in the present disclosure will be described below with reference to test results of Table 1.

TABLE 1

| | Y (BD-rate) | U (BD-rate) | V (BD-rate) | Improvement of encoding performance (EncT) | Improvement of decoding performance (DecT) |
|---|---|---|---|---|---|
| Class A1 | −0.05% | −0.12% | 0.01% | 135% | 115% |
| Class A2 | −0.01% | 0.08% | 0.10% | 130% | 111% |

TABLE 1-continued

| | Y (BD-rate) | U (BD-rate) | V (BD-rate) | Improvement of encoding performance (EncT) | Improvement of decoding performance (DecT) |
|---|---|---|---|---|---|
| Class B | −0.02% | −0.06% | 0.02% | 137% | 114% |
| Class C | −0.02% | −0.04% | −0.05% | 132% | 107% |
| Class E | 0.00% | −0.06% | 0.07% | 128% | 107% |
| Average | −0.02% | −0.04% | 0.02% | 133% | 111% |

As illustrated in Table 1, it can be seen from the test results that the solutions provided in the present disclosure has performance improvement for all sequences of artificial intelligence (AI) class, where the 4K sequence (i.e., category A1) has the significant improvement, with a bit rate saving of 0.05% in average. A Bjöntegaard delta bit rate (BD-rate) with a negative value indicates performance improvement of test results of the solution provided in the present disclosure relative to ECM2.0. It is worth noting that the TIMD prediction mode integrated in ECM2.0 has higher complexity on basis of ECM1.0 but only achieves a performance gain of 0.4%. In the present disclosure, a good performance gain can be brought without increasing the complexity of the decoder, especially for the 4K sequence. Furthermore, due to server loads, even though encoding time and decoding time fluctuate slightly, the decoding time will not substantially increase theoretically.

It is worth noting that in the present disclosure, the distortion cost involved in the decoder is different from the rate-distortion cost (RDcost) involved in the encoder. The rate-distortion cost is a distortion cost used at the encoding end for determining a particular intra prediction technology among multiple intra prediction technologies, and the rate-distortion cost can be a cost obtained by comparing a distorted picture with an original picture. Since the decoder is unable to acquire the original picture, the distortion cost involved in the decoder can be a distortion cost between the reconstructed sample and the predicted sample, such as an SATD cost between the reconstructed sample and the predicted sample or other costs for calculating a difference between the reconstructed sample and the predicted sample.

In some embodiments, the operations at S320 can include the following. The decoder parse the bitstream of the current sequence to obtain a first flag. When the first flag indicates that the optimal MIP mode is allowed to be used for predicting a picture block in the current sequence, the decoder determines the optimal MIP mode based on the distortion costs corresponding to the multiple MIP modes.

Exemplarily, if a value of the first flag is a first value, the first flag indicates that the optimal MIP mode is allowed to be used for predicting the picture block in the current sequence. If the value of the first flag is a second value, the first flag indicates that the optimal MIP mode is not allowed to be used for predicting the picture block in the current sequence. In an implementation, the first value is 1 and the second value is 0. In another implementation, the first value is 0 and the second value is 1. Certainly, the first value and the second value can also be other values, which is not limited in the present disclosure.

Exemplarily, if the first flag is true, the first flag indicates that the optimal MIP mode is allowed to be used for predicting the picture block in the current sequence. If the first flag is false, the first flag indicates that the optimal MIP mode is not allowed to be used for predicting the picture block in the current sequence.

Exemplarily, the decoder parses a block-level flag. If the intra prediction mode is used for the current block, the decoder parses or obtains the first flag. If the first flag is true, the decoder determines the optimal MIP mode based on the distortion costs corresponding to the multiple MIP modes.

Exemplarily, the first flag is denoted as sps_timd_enable_flag. In this case, the decoder parses or obtains sps_timd_enable_flag. If sps_timd_enable_flag is true, the decoder determines the optimal MIP mode based on the distortion costs corresponding to the multiple MIP modes.

Exemplarily, the first flag is a sequence-level flag.

It is noted that the first flag indicating that the optimal MIP mode is allowed to be used for predicting the picture block in the current sequence can also be replaced with descriptions having a similar or identical meaning. For example, in other alternative embodiments, the first flag indicating that the optimal MIP mode is allowed to be used for predicting the picture block in the current sequence can also be replaced with any one of: the first flag indicating that the TMMIP technology is allowed to be used for determining an intra prediction mode for the picture block in the current sequence, the first flag indicating that the TMMIP technology is allowed to be used for performing intra prediction on the picture block in the current sequence, the first flag indicating that the TMMIP technology is allowed to be used for the picture block in the current sequence, or the first flag indicating that an MIP mode determined based on the multiple MIP modes is allowed to be used for predicting the picture block in the current sequence.

In addition, in other alternative embodiments, when the TMMIP technology is combined with another technology, an enable flag of another technology can indirectly indicate whether the TMMIP technology is enabled for the current sequence. Taking the TIMD technology as an example, when the first flag indicates that the TIMD technology is enabled for the current sequence, it is indicated that the TMMIP technology is also enabled for the current sequence. Alternatively, when the first flag indicates that the TIMD technology is enabled for the current sequence, it is indicated that both the TIMD technology and the TMMIP technology are enabled for the current sequence, thereby further reducing bit overhead.

In some embodiments, when the first flag indicates that the optimal MIP mode is allowed to be used for predicting the picture block in the current sequence, the decoder parses the bitstream to obtain a second flag. When the second flag indicates that the optimal MIP mode is allowed to be used for predicting the current block, the decoder determines the optimal MIP mode based on the distortion costs corresponding to the multiple MIP modes.

Exemplarily, the decoder parses the block-level flag. If the intra prediction mode is used for the current block, the decoder parses or obtains the first flag. If the first flag is true, the decoder parses or obtains the second flag. If the second flag is true, the decoder determines the optimal MIP mode based on the distortion costs corresponding to the multiple MIP modes.

Exemplarily, if a value of the second flag is a third value, the second flag indicates that the optimal MIP mode is allowed to be used for predicting the current block. If the value of the second flag is a fourth value, the second flag indicates that the optimal MIP mode is not allowed to be used for predicting the current block. In an implementation, the third value is 1 and the fourth value is 0. In another implementation, the third value is 0 and the fourth value is 1. Certainly, the third value and the fourth value can also be other values, which are not limited in the present disclosure.

Exemplarily, if the second flag is true, the second flag indicates that the optimal MIP mode is allowed to be used for predicting the current block. If the second flag is false, the second flag indicates that the optimal MIP mode is not allowed to be used for predicting the current block.

Exemplarily, the first flag is noted as sps_timd_enable_flag, and the second flag is denoted as cu_timd_enable_flag. In this case, the decoder parses or obtains sps_timd_enable_flagt. If sps_timd_enable_flag is true, the decoder parses or obtains cu_timd_enable_flag. If cu_timd_enable_flag is true, the decoder determines the optimal MIP mode based on the distortion costs corresponding to the multiple MIP modes.

Exemplarily, the second flag is a block-level flag or a CU-level flag.

It is noted that the second flag indicating that the optimal MIP mode is allowed to be used for predicting the current block can also be replaced with descriptions having a similar or identical meaning. For example, in other alternative embodiments, the second flag indicating that the optimal MIP mode is allowed to be used for predicting the current block can also be replaced with any one of: the second flag indicating that the TMMIP technology is allowed to be used for determining the intra prediction mode of the current block, the second flag indicating that the TMMIP technology is allowed to be used for performing intra prediction on the current block, the second flag indicating that the TMMIP technology is allowed to be used for the picture block of the current block, or the second flag indicating that an MIP mode determined based on the multiple MIP modes is allowed to be used for predicting the current block.

In addition, in other alternative embodiments, when the TMMIP technology is combined with another technology, the enable flag of another technology can indirectly indicate whether the TMMIP technology is enabled for the current block. Taking the TIMD technology as an example, when the second flag indicates that the TIMD technology is enabled for the current block, it is indicated that the TMMIP technology is also enabled for the current block. Alternatively, when the second flag indicates that the TIMD technology is enabled for the current block, it is indicated that both the TIMD technology and the TMMIP technology are enabled for the current block, thereby further reducing the bit overhead.

Furthermore, the decoding end can parse the second flag either before parsing the residual block of the current block or after parsing the residual block of the current block, which is not limited in the present disclosure.

In some embodiments, the method 300 can further include the following. The decoder determines an arrangement order of the multiple MIP modes based on the distortion costs corresponding to the multiple MIP modes. The decoder determines a coding manner used for the optimal MIP mode based on the arrangement order of the multiple MIP modes. The decoder decodes the bitstream of the current sequence based on the coding manner used for the optimal MIP mode, to obtain an index of the optimal MIP mode.

Exemplarily, before the decoder determines, based on the distortion costs corresponding to the multiple MIP modes, the optimal MIP mode for predicting the current block, the decoder calculates a distortion cost corresponding to each of the multiple MIP modes and sorts the multiple MIP modes according to the distortion cost corresponding to each of the multiple MIP modes, and an MIP mode with the minimum cost is an optimal prediction result.

It can be noted that for the traditional MIP technologies, an index of the MIP mode is usually binarized by TB which is similar to equal probability coding, i.e., each prediction mode is divided into two segments, where one segment is indicated by N code words, and the other one is indicated by N+1 code words. Therefore, in the present disclosure, before the decoder determines, based on the distortion costs corresponding to the multiple MIP modes, the optimal MIP mode for predicting the current block, the decoder can calculate the distortion cost corresponding to each of the multiple MIP modes and sort the multiple MIP modes based on the distortion cost corresponding to each of the multiple MIP modes. Finally, the decoder can choose to use more flexible variable-length coding based on the arrangement order of the multiple MIP modes. Compared with the equal probability coding, the bit overhead of the index of the MIP mode can be saved by flexibly setting the coding manner of the MIP mode.

In some embodiments, a codeword length of a coding manner used for each of first n MIP modes in the arrangement order is less than a codeword length of a coding manner used for each of MIP modes following the n-th MIP mode in the arrangement order.

Additionally/Alternatively, variable-length coding is used for the first n MIP modes, and TB encoding is used for the MIP modes following the n-th MIP mode.

Exemplarily, N can be any value greater than or equal to 1.

Exemplarily, the arrangement order is an order obtained by the decoder arranging the multiple MIP modes in ascending order of the corresponding distortion costs. The codeword length of the coding manner used for each of first n MIP modes in the arrangement order is less than the codeword length of the coding manner used for each of MIP modes following the n-th MIP mode in the arrangement order. Additionally/Alternatively, the variable-length coding is used for the first n MIP modes, and the TB encoding is used for the MIP modes following the n-th MIP mode.

In this embodiment, when a distortion cost corresponding to an MIP mode is smaller, a probability that the encoder performs intra prediction on the current block in this MIP mode will be higher. Therefore, the codeword length of the coding manner used for each of first n MIP modes in the arrangement order is designed to be less than the codeword length of the coding manner used for each of MIP modes following the n-th MIP mode in the arrangement order. Additionally/Alternatively, the variable-length coding is designed to be used for the first n MIP modes, and the TB encoding is designed to be used for the MIP modes following the n-th MIP mode. In this way, a shorter codeword length or the variable-length coding is used for an MIP mode which is more likely to be used by the encoder, thereby reducing bit overhead of the index of the MIP mode and improving the decompression performance.

In some embodiments, the operations at S330 can include the following. The decoder determines the optimal MIP mode as the intra prediction mode of the current block.

Exemplarily, after the optimal MIP mode is determined, the decoder performs intra prediction on the current block directly based on the optimal MIP mode, to obtain the prediction block of the current block.

In some embodiments, the operations at S330 can include the following. The decoder predicts the current block in the optimal MIP mode, to obtain a first prediction block. The decoder predicts the current block in a TIMD mode, to obtain a second prediction block. The decoder determines, based on a distortion cost of the first prediction block and a distortion cost of the second prediction block, a prediction mode having a smaller distortion cost between the optimal MIP mode and the TIMD mode as the intra prediction mode of the current block.

Exemplarily, after the optimal MIP mode is determined, the decoder determines an optimal intra prediction mode between the optimal MIP mode and the TIMD mode as the intra prediction mode of the current block.

Exemplarily, if the optimal prediction mode between the optimal MIP mode and the TIMD mode is the optimal MIP mode, the decoder can perform intra prediction on the current block directly based on the optimal MIP mode, to obtain the prediction block of the current block. If the optimal prediction mode between the optimal MIP mode and the TIMD mode is the TIMD mode, the decoder can obtain the prediction block of the current block directly based on an optimal prediction mode and a suboptimal prediction mode which are derived from the TIMD mode. For example, if neither the optimal prediction mode nor the suboptimal prediction mode is a DC mode (which can also be referred to as "mean mode") or a planar mode (which can also be referred to as "plane mode"), and the distortion cost corresponding to the suboptimal prediction mode is less than twice the distortion cost corresponding to the optimal prediction mode, prediction blocks need to be fused. In other words, firstly, the decoder can perform intra prediction on the current block in the optimal prediction mode to obtain an optimal prediction block. Secondly, the decoder can perform intra prediction on the current block in the suboptimal prediction mode to obtain a suboptimal prediction block. Thirdly, a weighted value of the optimal prediction block and a weighted value of the suboptimal prediction block are obtained with the ratio of the distortion cost corresponding to the optimal prediction mode to the distortion cost corresponding to the suboptimal prediction mode. Finally, weighted fusion is performed on the optimal prediction block and the suboptimal prediction block to obtain the prediction block of the current block. For another example, if the optimal prediction mode or the suboptimal prediction mode is the planar mode or the DC mode, or if the distortion cost corresponding to the suboptimal prediction mode is greater than twice the distortion cost corresponding to the optimal prediction mode, the prediction blocks do not need to be fused, i.e., the optimal prediction block obtained in the optimal prediction mode can be directly taken as the prediction block of the current block.

In some embodiments, the operations at S320 can include the following. The decoder predicts the samples in the template region based on a third flag and the multiple MIP modes, to obtain distortion costs corresponding to the multiple MIP modes in each state of the third flag, where the third flag indicates whether an input vector and an output vector corresponding to an MIP mode are transposed. The decoder determines the optimal MIP mode based on the distortion costs corresponding to the multiple MIP modes in each state of the third flag.

As mentioned above, the traditional MIP technologies need more bit overhead than other intra prediction tools. The traditional MIP technologies not only need a flag to indicate whether the MIP technology is used, but also need a flag to indicate whether the MIP is transposed. In addition, the traditional MIP technologies also need TB encoding to indicate the MIP prediction mode, which needs the largest overhead. The MIP technology is simplified from neural network and is quite different from the traditional interpolation filtering prediction technology. For some special textures, the MIP prediction mode works better than the traditional intra prediction mode, but has a deficiency of requiring relatively large flag overhead. For example, for the 4×4-sized CU, there are 16 predicted samples in total, but it requires bit overhead including one MIP usage flag, one MIP transpose flag, a TB flag of five or six bits. Therefore, in the present disclosure, in determining the optimal MIP mode, a transpose function of the MIP mode is considered by traversing each state of the third flag, which can save overheads of one MIP transpose flag, thereby improving the decompression efficiency.

Exemplarily, the decoder determines the distortion costs corresponding to the multiple MIP modes in each state of the third flag by traversing each state of the third flag and the multiple MIP modes, and then determines the optimal MIP mode based on the distortion costs corresponding to the multiple MIP modes in each state of the third flag. Alternatively, the decoder determines the distortion costs, in each state of the third flag, corresponding to the multiple MIP modes by traversing each state of the third flag and the multiple MIP modes, and then determines the optimal MIP mode based on the distortion costs, in each state of the third flag, corresponding to the multiple MIP modes. In other words, the decoding end can first traverse the multiple MIP modes or can first traverse the states of the third flag.

Exemplarily, if a value of the third flag is a fifth value, the third flag indicates that the input vector and the output vector corresponding to the MIP mode are transposed. If the value of the third flag is a sixth value, the third flag indicates that the input vector and the output vector corresponding to the MIP mode are not transposed. In this case, each state of the third flag can be replaced with each value of the third flag. In an implementation, the fifth value is 1 and the sixth value is 0. In another implementation, the fifth value is 0 and the sixth value is 1. Certainly, the fifth value and the sixth value can also be other values, which is not limited in the present disclosure.

Exemplarily, if the third flag is true, the third flag indicates that the input vector and the output vector corresponding to the MIP mode are transposed. If the third flag is false, the third flag indicates that the input vector and the output vector corresponding to the MIP mode are not transposed. In this case, the third flag being true or false is a state of the third flag.

Exemplarily, the third flag is a sequence-level flag, a block-level flag, or a CU-level flag.

Exemplarily, the third flag can also be referred to as "transpose message", "transpose flag", or "MIP transpose flag".

It is noted that the third flag indicating that whether the input vector and the output vector corresponding to the MIP mode are transposed can also be replaced with descriptions having a similar or identical meaning. For example, in other alternative embodiments, the third flag indicates that whether an input and an output corresponding to the MIP mode are transposed, the third flag indicates whether the input vector and the output vector corresponding to the MIP mode are transposed vectors, or the third flag indicates whether to transpose.

In some embodiments, the operations at S320 can include the following. When a size of the current block is a preset size, the decoder determines the optimal MIP mode based on the distortion costs corresponding to the multiple MIP modes.

Exemplarily, the preset size can be a size of a preset width and a preset height. In other words, if the current block has the preset width and the preset height, the decoder determines the optimal MIP mode based on the distortion costs corresponding to the multiple MIP modes.

Exemplarily, the preset size can be implemented by pre-saving corresponding codes, tables, or other means that can indicate relevant information in a device (e.g., including the decoder and the encoder), and the specific implementation is not limited in the present disclosure. For example, the preset size can refer to a size defined in protocols. Optionally, the "protocols" can refer to standard protocols in the field of coding technology. For example, the "protocols" can include relevant protocols such as a VCC, an ECM protocol, etc.

Certainly, in other alternative embodiments, the decoder can also determine, based on the preset size in other manners, whether to determine the optimal MIP mode based on the distortion costs corresponding to the multiple MIP modes, which is not limited in the present disclosure.

For example, the decoder can determine, only based on the width or the height of the current block, whether to determine the optimal MIP mode based on the distortion costs corresponding to the multiple MIP modes. In an implementation, if the width of the current block is the preset width or the height of the current block is the preset height, the decoder determines the optimal MIP mode based on the distortion costs corresponding to the multiple MIP modes. For another example, the decoder can determine whether to determine the optimal MIP mode based on the distortion costs corresponding to the multiple MIP modes by comparing the size of the current block with the preset size. In an implementation, if the size of the current block is greater or less than the preset size, the decoder determines the optimal MIP mode based on the distortion costs corresponding to the multiple MIP modes. In another implementation, if the width of the current block is greater or less than the preset width, the decoder determines the optimal MIP mode based on the distortion costs corresponding to the multiple MIP modes. In another implementation, if the height of the current block is greater or less than the preset height, the decoder determines the optimal MIP mode based on the distortion costs corresponding to the multiple MIP modes.

In some embodiments, the operations at S320 can include the following. When a frame containing the current block is an I-frame and the size of the current block is the preset size, the decoder determines the optimal MIP mode based on the distortion costs corresponding to the multiple MIP modes.

Exemplarily, if the frame containing the current block is the I-frame, the width of the current block is the preset width, and the height of the current block is the preset height, the decoder determines the optimal MIP mode based on the distortion costs corresponding to the multiple MIP modes. In other words, only when the frame containing the current block is the I-frame, the decoder determines, based on the size of the current block, whether to determine the optimal MIP mode based on the distortion costs corresponding to the multiple MIP modes.

In some embodiments, the operations at S320 can include the following. When the frame containing the current block is a B-frame, the decoder determines the optimal MIP mode based on the distortion costs corresponding to the multiple MIP modes.

Exemplarily, if the frame containing the current block is the B-frame, the decoder can directly determine the optimal MIP mode based on the distortion costs corresponding to the multiple MIP modes. In other words, when the frame containing the current block is the B-frame, regardless of the size of the current block, the decoder can directly determine the optimal MIP mode directly based on the distortion costs corresponding to the multiple MIP modes.

In some embodiments, before the operations at S320, the method 300 can further include the following. The decoder obtains MIP modes used for a neighbouring block adjacent to the current block. The decoder determines the MIP modes used for the neighbouring block as the multiple MIP modes.

Exemplarily, the neighbouring block can be a picture block adjacent to at least one of the top, the left, the bottom left, the top right, or the top left of the current block. For example, the decoder can determine a picture block obtained in an order of the top, the left, the bottom left, the top right, and the top left of the current block as the neighbouring block. Optionally, the multiple MIP modes can be used for constructing available MIP modes or a list of the available MIP modes, which are determined by the decoder and used for predicting the current block, so that the decoder determines the optimal MIP mode among the available MIP modes or from the list of available MIP modes by predicting the samples in the template region.

In some embodiments, before the operations at S320, the method 300 can further include the following. The decoder performs reconstructed-sample padding on a reference region adjacent to the outside of the template region, to obtain a reference row and a reference column of the template region. The decoder predicts the samples in the template region in the multiple MIP modes respectively with the reference row and the reference column as inputs, to obtain multiple prediction blocks corresponding to the multiple MIP modes. The decoder determines the distortion costs corresponding to the multiple MIP modes based on the multiple prediction blocks and a reconstructed block of the template region.

Exemplarily, the decoder performs padding with reference reconstructed samples needed for template prediction.

Exemplarily, a width of a region in the reference region adjacent to the top of the template region is equal to a width of the template region, and a height of a region in the reference region adjacent to the left of the template region is equal to the height of the template region. If the width of the region in the reference region adjacent to the top of the template region is greater than the width of the template region, the decoder can perform down-sampling or dimensionality reduction on the region in the reference region adjacent to the top of the template region, to obtain the reference row. If the height of the region in the reference region adjacent to the left of the template region is greater than the height of the template region, the decoder can perform down-sampling or dimensionality reduction on the region in the reference region adjacent to the left of the template region, to obtain the reference column.

Exemplarily, the template region can be the template region used for the TIMD mode, and the reference region can be the reference of template used for the TIMD mode. For example, in connection with FIG. 3, if the current block is a CU with a width equal to M and a height equal to N, the decoder performs reconstructed-sample padding on the reference region consisting of a CU with a width equal to 2 (M+/1)+1 and a height equal to 2 (N+1.2)+1, down-samples or performs dimensionality reduction on the padded reference region to obtain the reference row and the reference column, and then constructs input vectors corresponding to the MIP modes based on the reference row and the reference column.

Exemplarily, after the reference row and the reference column are obtained by the decoder, the decoder predicts the samples in the template region in the multiple MIP modes respectively with the reference row and the reference column as the inputs, to obtain the multiple prediction blocks corresponding to the multiple MIP modes. In other words, based on the reconstructed samples in the reference of template of the current block, the decoder predicts samples in the template region of the current block by traversing the multiple MIP modes. Taking a currently traversed MIP mode as an example, the decoder takes the reference row, the reference column, an index of the currently traversed MIP mode, and the third flag as inputs, to obtain a prediction block corresponding to the currently traversed MIP mode. The reference row and the reference column are used for constructing an input vector corresponding to the currently traversed MIP mode. The index of the currently traversed MIP mode is used for determining a matrix and/or a bias vector corresponding to the currently traversed MIP mode. The third flag indicates whether the input vector and the output vector corresponding to the MIP mode are transposed. For example, if the third flag indicates the input vector and the output vector corresponding to the MIP mode are not transposed, the reference column is placed at the end of the reference row, to form the input vector corresponding to the currently traversed MIP mode. If the third flag indicates the input vector and the output vector corresponding to the MIP mode are transposed, the reference row is placed at the end of the reference column, to form the input vector corresponding to the currently traversed MIP mode. Correspondingly, if the third flag indicates the input vector and the output vector corresponding to the MIP mode are transposed, the decoder transposes the output of the currently traversed MIP mode to obtain a prediction block of the template region. After the decoder obtains the multiple prediction blocks corresponding to the multiple MIP modes by traversing the multiple MIP modes, the decoder can select, based on distortion costs between the multiple prediction blocks and the reconstructed samples in the template region, an MIP mode with a minimum cost according to the principle of the minimum distortion cost, and determine the MIP mode with the minimum cost as the optimal MIP mode for the current block in a template matching-based MIP (TMMIP) mode.

In some embodiments, when the decoder predicts the samples in the template region in the multiple MIP modes respectively, the decoder firstly down-samples the reference row and the reference column to obtain an input vector. Then, the decoder predicts the samples in the template region by traversing the multiple MIP modes with the input vector as an input, to obtain output vectors corresponding to the multiple MIP modes. Finally, the decoder up-samples the output vectors corresponding to the multiple MIP modes to obtain the prediction blocks corresponding to the multiple MIP modes.

Exemplarily, the reference row and the reference column satisfy input conditions for the multiple MIP modes. If the reference row and the reference column do not satisfy the input conditions for the multiple MIP modes, the reference row and/or the reference column can be first processed as input samples that satisfy the input conditions for the multiple MIP modes, and then input vectors corresponding to the multiple MIP modes can be determined based on the input samples that satisfy the input conditions for the multiple MIP modes. For illustrative purposes, the input condition is a specified number of input samples. If the reference row and the reference column do not satisfy the number of input samples for the MIP modes, the decoder can dimensionality-reduce the reference row and/or the reference column to the specified number of input samples by means of Haar-downsampling or other manners, and then determine the input vectors corresponding to the multiple MIP modes based on the dimensionality-reduced specified number of input samples.

In some embodiments, S320 can include the following. The decoder determines the optimal MIP mode based on SATDs corresponding to the multiple MIP modes in the template region.

In this embodiment, when the decoder determines the optimal MIP mode based on the distortion costs corresponding to the multiple MIP modes in the template region, the distortion costs corresponding to the multiple MIP modes are designed to be the SATDs corresponding to the multiple MIP modes. In this way, compared with directly calculating rate-distortion costs corresponding to the multiple MIP modes, the optimal MIP mode can be determined based on the distortion costs corresponding to the multiple MIP modes in the template region, and the complexity of calculating the distortion costs corresponding to the multiple MIP modes can be simplified, thereby improving the decompression performance.

In conclusion, a main idea of the template matching-based MIP mode derivation method for the decoder can include the following parts.

Firstly, the reference region (e.g., the reference of template illustrated in FIG. 3) is padded with reconstructed samples, where the reconstructed samples are reference reconstructed samples needed for predicting the samples in the template region (e.g., the template illustrated in FIG. 3). Optionally, the width and the height of the reference region do not need to exceed the width and the height of the template region. If the width and the height of the reference region padded with samples are larger than the width and the height of the template region, dimensionality reduction needs to be performed by means of down-sampling or other manners, so as to satisfy the requirement for an input dimension of MIP.

Then, the decoder predicts the samples in the template region with the reference reconstructed samples in the reference region, the indexes of the multiple MIP modes, and the MIP transpose flag as inputs, to obtain the prediction blocks corresponding to the multiple MIP modes. Optionally, the reference reconstructed samples in the reference region need to satisfy the input conditions for the multiple MIP modes. If not, dimensionality reduction can be performed on the reference reconstructed samples to the specified number of input samples by means of Haar-downsampling or other manners. The indexes of the multiple MIP modes are used for determining matrix indexes of the MIP technologies, to obtain MIP prediction matrix coefficients. The MIP transpose flag indicates whether the input and the output need to be transposed.

Finally, for the prediction blocks corresponding to the multiple MIP modes, combinations of all the MIP modes and whether to transpose the MIP can be traversed, to obtain the predicted samples in the template region for each of the multiple MIP modes and in each state of the MIP transpose flag. The distortions between the predicted samples and the reconstructed samples in the template region are calculated and cost information thereof are recorded. Finally, the MIP mode with the minimum cost and corresponding MIP transpose information can be obtained according to the principle of the minimum distortion, and the MIP mode with the minimum cost is the optimal MIP mode for the current block in the template matching-based MIP mode.

It can be noted that some of the calculations involved in the present disclosure can be replaced by lookup tables and shifts. Although the lookup tables can have some error in results compared with division, hardware can be easily implemented and the coding cost can be controlled. For example, these calculations involve calculations on the distortion costs or calculations on determining the optimal MIP mode.

The decoding method of embodiments of the present disclosure has been described in detail above from the perspective of the decoder, and an encoding method of embodiments of the present disclosure will be described below from the perspective of the encoder in connection with FIG. 6.

Figure 6:
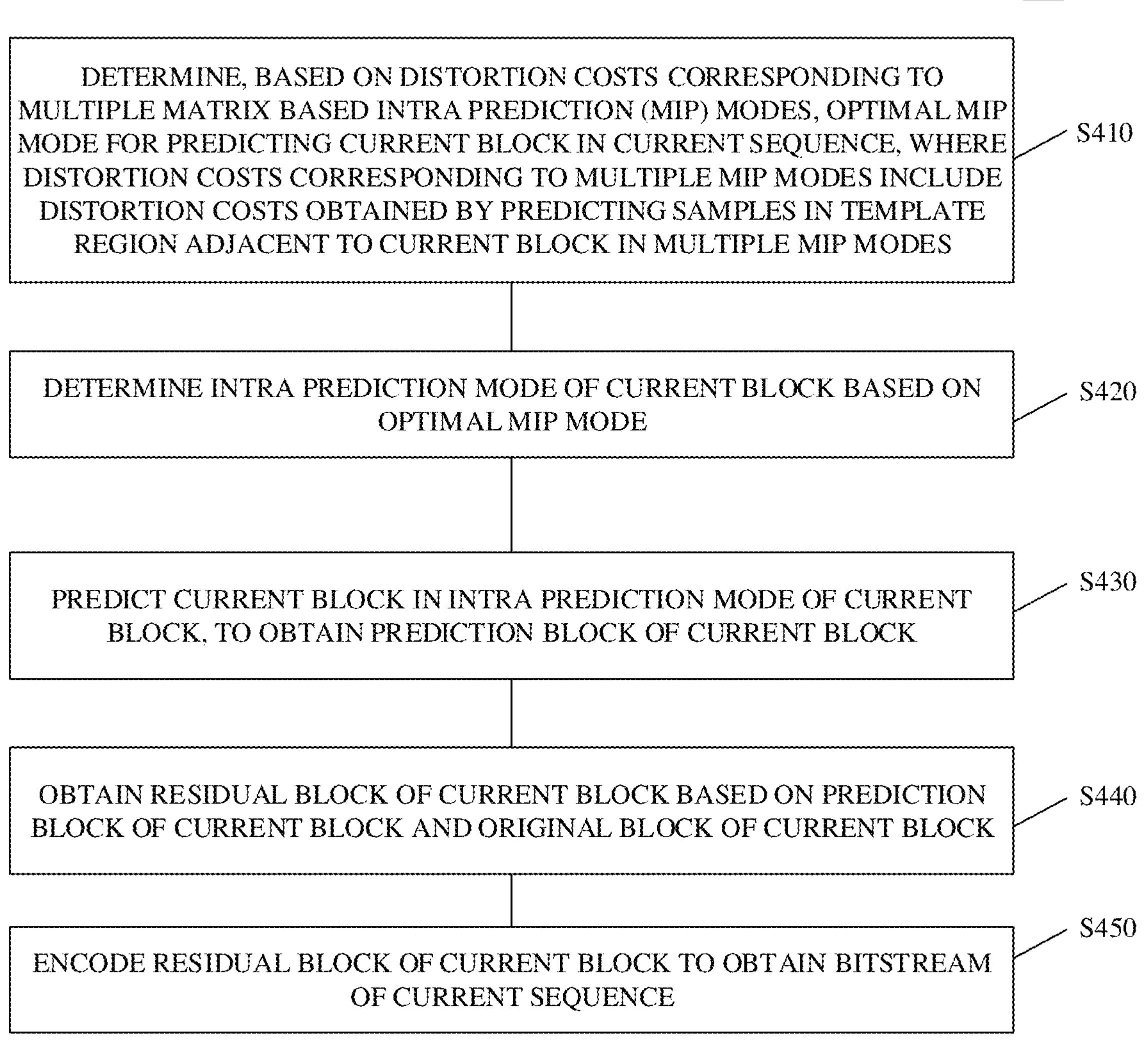
FIG. 6 is a schematic flowchart of an encoding method provided in embodiments of the present disclosure.

FIG. 6 is a schematic flowchart of an encoding method 400 provided in embodiments of the present disclosure. It can be understood that the encoding method 400 can be performed by an encoder. For example, the method 400 is applicable to the encoding framework 100 illustrated in FIG. 1. For ease of description, the encoder is illustrated below as an example.

As illustrated in FIG. 6, the encoding method 400 can include the following.

S410, an optimal MIP mode for predicting a current block in a current sequence is determined based on distortion costs corresponding to multiple MIP modes, where the distortion costs corresponding to the multiple MIP modes include distortion costs obtained by predicting samples in a template region adjacent to the current block in the multiple MIP modes.

S420, an intra prediction mode of the current block is determined based on the optimal MIP mode.

S430, the current block is predicted in the intra prediction mode of the current block, to obtain a prediction block of the current block.

S440, a residual block of the current block is obtained based on the prediction block of the current block and an original block of the current block.

S450, the residual block of the current block is encoded to obtain a bitstream of the current sequence.

In some embodiments, the operations at S410 can include the following. A first flag is obtained. When the first flag indicates that the optimal MIP mode is allowed to be used for predicting a picture block in the current sequence, the optimal MIP mode is determined based on the distortion costs corresponding to the multiple MIP modes.

The operations at S450 can include the following. The residual block of the current block and the first flag are encoded to obtain the bitstream.

In some embodiments, the operations at S420 can include the following. If the first flag indicates that the optimal MIP mode is allowed to be used for predicting the picture block in the current sequence, an optimal prediction mode is determined based on the optimal MIP mode. The current block is predicted in the optimal prediction mode, to obtain a first rate-distortion cost. The current block is predicted in at least one intra prediction mode to obtain at least one rate-distortion cost. If the first rate-distortion cost is less than or equal to a minimum of the at least one rate-distortion cost, the optimal prediction mode is determined as the intra prediction mode of the current block.

The operations at S450 can include the following. The residual block of the current block, the first flag, and a second flag are encoded to obtain the bitstream, where when the first rate-distortion cost is less than or equal to the minimum of the at least one rate-distortion cost, the second flag indicates that the optimal MIP mode is allowed to be used for predicting the current block; and when the first rate-distortion cost is greater than the minimum of the at least one rate-distortion cost, the second flag indicates that the optimal MIP mode is not allowed to be used for predicting the current block.

In some embodiments, the operations at S420 can include the following. The optimal MIP mode is determined as the optimal prediction mode.

In some embodiments, the operations at S420 can include the following. The current block is predicted in the optimal MIP mode, to obtain a first prediction block. The current block is predicted in a TIMD mode, to obtain a second prediction block. Based on a distortion cost of the first prediction block and a distortion cost of the second prediction block, a prediction mode having a smaller distortion cost between the optimal MIP mode and the TIMD mode is determined as the optimal prediction mode.

In some embodiments, the operations at S450 can include the following. An arrangement order of the multiple MIP modes is determined based on the distortion costs corresponding to the multiple MIP modes. A coding manner used for the optimal MIP mode is determined based on the arrangement order of the multiple MIP modes. The residual block of the current block is encoded, and an index of the optimal MIP mode is encoded in the coding manner used for the optimal MIP mode to obtain the bitstream.

In some embodiments, a codeword length of a coding manner used for each of first n MIP modes in the arrangement order is less than a codeword length of a coding manner used for each of MIP modes following the n-th MIP mode in the arrangement order. Additionally/Alternatively, variable-length coding is used for the first n MIP modes, and TB encoding is used for the MIP modes following the n-th MIP mode.

In some embodiments, the operations S410 can include the following. The samples in the template region are predicted based on a third flag and the multiple MIP modes to obtain distortion costs corresponding to the multiple MIP modes in each state of the third flag, where the third flag indicates whether an input vector and an output vector corresponding to an MIP mode are transposed. The optimal MIP mode is determined based on the distortion costs corresponding to the multiple MIP modes in each state of the third flag.

In some embodiments, the operations S410 can include the following. When a size of the current block is a preset size, the optimal MIP mode is determined based on the distortion costs corresponding to the multiple MIP modes.

In some embodiments, the operations S410 can include the following. When a frame containing the current block is an I-frame and the size of the current block is the preset size, the optimal MIP mode is determined based on the distortion costs corresponding to the multiple MIP modes.

In some embodiments, the operations S410 can include the following. When the frame containing the current block is a B-frame, the optimal MIP mode is determined based on the distortion costs corresponding to the multiple MIP modes.

In some embodiments, before the operations at S410, the method 400 can further include the following. MIP modes used for a neighbouring block adjacent to the current block are obtained. The MIP modes used for the neighbouring block are determined as the multiple MIP modes.

In some embodiments, before the operations at S410, the method 400 can further include the following. Reconstructed-sample padding is performed on a reference region adjacent to the outside of the template region to obtain a reference row and a reference column of the template region. The samples are predicted in the template region in the multiple MIP modes respectively with the reference row and the reference column as inputs to obtain multiple prediction blocks corresponding to the multiple MIP modes. The distortion costs corresponding to the multiple MIP modes are determined based on the multiple prediction blocks and a reconstructed block of the template region.

In some embodiments, when the samples are predicted in the template region in the multiple MIP modes respectively, the reference row and the reference column are firstly down-sampled to obtain an input vector. Then, the samples are predicted in the template region by traversing the multiple MIP modes with the input vector as an input, to obtain output vectors corresponding to the multiple MIP modes. Finally, the output vectors corresponding to the multiple MIP modes are up-sampled to obtain the prediction blocks corresponding to the multiple MIP modes.

In some embodiments, the operations at S410 can include the following. The optimal MIP mode is determined based on SATDs corresponding to the multiple MIP modes in the template region.

It can be appreciated that the encoding method can be understood as an inverse process of the decoding method. Therefore, for the specific solutions of the encoding method 400, reference can be made to related contents of the decoding method 300, which is not repeated herein for simplicity.

The solutions of the present disclosure are described below in connection with specific embodiments.

Embodiment 1

In this embodiment, the encoder or the decoder can directly determine the optimal MIP mode for predicting the current block as the intra prediction mode of the current block.

The encoder traverses the prediction modes. If an intra mode is used for the current block, the encoder obtains a sequence-level enable flag indicating whether a template matching-based MIP mode derivation technology is enabled for the current sequence. For example, the sequence-level enable flag can be sps_tmmip_enable_flag. If the enable flag for tmmip is true, it is indicated that the encoder enables the TMMIP technology currently.

Exemplarily, the encoder can operate as follows.

Step 1

If sps_tmmip_enable_flag is true, the encoder tries the TMMIP technology, i.e., the encoder performs Step 2. If sps_tmmip_enable_flag is false, the encoder does not try the TMMIP technology, i.e., the encoder skips Step 2 and directly performs Step 3.

Step 2

Firstly, the encoder performs reconstructed-sample padding on a row and a column both adjacent to the outside of the template region. The padding process is the same as padding in an original intra prediction process. For example, the encoder can traverse and pad from the bottom-left corner to the top-right corner. If all of the reconstructed samples are available, padding is performed with all of the available reconstructed samples in sequence. If all of the reconstructed samples are unavailable, padding is performed with the average. If some of the reconstructed samples are available, padding is performed with the available reconstructed samples, and then for the rest of the unavailable reconstructed samples, the encoder can traverse in the order from the bottom-left corner to the top-right corner until the first available reconstructed sample appears, and then the previously unavailable position(s) is padded with the first available reconstructed sample.

Then, the encoder takes the reconstructed samples at the outside of the padded template region as inputs and predicts the samples in the template region in MIP modes that are allowed to be used.

Exemplarily, 16 MIP modes are available for a 4×4-sized block, 8 MIP modes are available for a block with a width or height of 4 or for an 8×8-sized block, and 6 MIP modes are available for blocks with other sizes. In addition, a block of any size can have an MIP transpose function, and the TMMIP prediction mode is the same as the MIP technology.

Exemplarily, the calculation on prediction includes the following. Firstly, the encoder performs Haar-downsampling on the reconstructed samples. For example, the encoder determines a down-sampling step size based on a block size. Secondly, the encoder adjusts, according to whether to transpose, a concatenation order of the down-sampled reconstructed samples on the top and the down-sampled reconstructed samples on the left. If not transposed, the down-sampled reconstructed samples on the left are concatenated to the end of the down-sampled reconstructed samples on the top, and the obtained vector is taken as an input. If transposed, the down-sampled reconstructed samples on the top are concatenated to the end of the down-sampled reconstructed samples on the left, and the obtained vector is taken as the input. Thirdly, the encoder obtains an MIP matrix coefficient by using the traversed prediction mode as the index. The encoder obtains the output vector based on the MIP matrix coefficient and the input. Finally, the encoder up-samples the output vector according to the number of samples of the output vector and the size of the current template. If up-sampling is not needed, the output vector is arranged in sequence in a horizontal direction to obtain a prediction block of the template. If up-sampling is needed, the output vector is up-sampled in the horizontal direction and then is up-sampled in a vertical direction, to up-sample to the same size as that of the template, so as to output the prediction block of the template region.

Next, the encoder calculates the distortion costs based on the reconstructed samples in the template region and the prediction blocks of the template region obtained by traversing each of the multiple MIP modes, and records distortion costs in each of the prediction modes and in the transpose information. After all of the available prediction modes and the transpose information are traversed, the optimal MIP mode and its corresponding transpose information are selected as the optimal prediction mode of the current block in TMMIP mode.

Finally, the encoder down-samples, according to the obtained optimal MIP mode and transpose information, the reconstructed samples adjacent to the top and the left of the current block, as appropriate, performs concatenation according to the transpose information to obtain the input vector, and reads a matrix coefficient in the current mode by using the MIP mode as an index. Then, the encoder obtains the output vector by calculating the input vector and the matrix coefficient. The encoder can transpose the output according to the transpose information, and up-sample the output vector according to the size of the current block and the number of samples of the output vector, to obtain an output of the same size as the current block as the prediction block of the current block. Based on this, the encoder obtains a rate-distortion cost of the current block, which is denoted as cost1.

Step 3

The encoder continues to traverse other intra prediction technologies and calculates corresponding rate-distortion costs denoted as cost2, . . . , costN.

Step 4

If cost1 is a minimum rate-distortion cost, the TMMIP technology is used for the current block, and the encoder sets a TMMIP usage flag of the current block to be true and signals it into the bitstream. If cost1 is not the minimum rate-distortion cost, other intra prediction technologies are used for the current block, and the encoder sets the TMMIP usage flag of the current block to be false and signals into the bitstream. It can be understood that information such as flags or indexes for other intra prediction technologies is transmitted according to definition, which is not repeated herein.

Step 5

The encoder determines the residual block of the current block based on the prediction block of the current block and the original block of the current block, and performs operations such as transform and quantization, entropy coding, loop filtering, etc., on the residual block of the current block. It can be understood that for the specific process, reference can be made to related contents of the above, which is not repeated herein for simplicity.

The related solutions of the decoder in embodiments of the present disclosure are described below.

The decoder parses a block-level flag. If an intra mode is used for the current block, the decoder parses or obtains a sequence-level enable flag for indicating whether the template matching-based MIP mode derivation technology is enabled for the current sequence. For example, the sequence-level enable flag can be sps_tmmip_enable_flag. If the enable flag for tmmip is true, it is indicated that the decoder enables the TMMIP technology currently.

Exemplarily, the decoder can operate as follows.

Step 1

If sps_tmmip_enable_flag is true, the decoder parses the TMMIP usage flag of the current block. Otherwise, in a current decoding process, the block-level TMMIP usage flag does not need to be decoded, and the block-level TMMIP usage flag is false by default. If the TMMIP usage flag of the current block is true, Step 2 is performed. Otherwise, Step 3 is performed.

Step 2

Firstly, the decoder performs reconstructed-sample padding on a row and a column both adjacent to the outside of the template region. The padding process is the same as padding in an original intra prediction process. For example, the decoder can traverse and pad from the bottom-left corner to the top-right corner. If all of the reconstructed samples are available, padding is performed with all of the available reconstructed samples in sequence. If all of the reconstructed samples are unavailable, padding is performed with the average. If some of the reconstructed samples are available, padding is performed with the available reconstructed samples, and then for the rest of the unavailable reconstructed samples, the decoder can traverse in the order from the bottom-left corner to the top-right corner until the first available reconstructed sample appears, and then the previously unavailable position(s) is padded with the first available reconstructed sample.

Then, the decoder takes the reconstructed samples at the outside of the padded template region as inputs and predicts the samples in the template region in MIP modes that are allowed to be used.

Exemplarily, 16 MIP modes are available for a 4×4-sized block, 8 MIP modes are available for a block with a width or height of 4 or for an 8×8-sized block, and 6 MIP modes are available for blocks with other sizes. In addition, a block of any size can have an MIP transpose function, and the TMMIP prediction mode is the same as the MIP technology.

Exemplarily, the calculation on prediction includes the following. Firstly, the decoder performs Haar-downsampling on the reconstructed samples. For example, the decoder determines a down-sampling step size based on a block size. Secondly, the decoder adjusts, according to whether to transpose, a concatenation order of the down-sampled reconstructed samples on the top and the down-sampled reconstructed samples on the left. If not transposed, the down-sampled reconstructed samples on the left are concatenated to the end of the down-sampled reconstructed samples on the top, and the obtained vector is taken as an input. If transposed, the down-sampled reconstructed samples on the top are concatenated to the end of the down-sampled reconstructed samples on the left, and the obtained vector is taken as the input. Thirdly, the decoder obtains an MIP matrix coefficient by using the traversed prediction mode as the index. The decoder obtains the output vector based on the MIP matrix coefficient and the input. Finally, the decoder up-samples the output vector according to the number of samples of the output vector and the size of the current template. If up-sampling is not needed, the output vector is arranged in sequence in a horizontal direction to obtain a prediction block of the template. If up-sampling is needed, the output vector is up-sampled in the horizontal direction and then is up-sampled in a vertical direction, to up-sample to the same size as that of the template, so as to output the prediction block of the template region.

Next, the decoder calculates the distortion costs based on the reconstructed samples in the template region and the prediction blocks of the template region obtained by traversing each of the multiple MIP modes, and records distortion costs in each of the prediction modes and in the transpose information. After all of the available prediction modes and the transpose information are traversed, the optimal MIP mode and its corresponding transpose information are selected as the optimal prediction mode of the current block in TMMIP mode.

Finally, the decoder down-samples, according to the obtained optimal MIP mode and transpose information, the reconstructed samples adjacent to the top and the left of the current block, as appropriate, performs concatenation according to the transpose information to obtain the input vector, and reads a matrix coefficient corresponding to the current mode by using the MIP mode as an index. Then, the decoder obtains the output vector by calculating the input vector and the matrix coefficient. The decoder can transpose the output according to the transpose information, and up-sample the output vector according to the size of the current block and the number of samples of the output vector, to obtain an output of the same size as the current block as the prediction block of the current block.

Step 3

The decoder continues to parse information such as the usage flags or the indexes for other intra prediction technologies and obtains the final prediction block of the current block according to the parsed information.

Step 4

The decoder parses the bitstream and obtains a frequency-domain residual block (also referred to as "frequency-domain residual information") of the current block, and performs inverse quantization and inverse transformation on the frequency-domain residual block of the current block to obtain the residual block of the current block (also referred to as "temporal residual block" or "temporal residual information"). Then, the decoder adds the prediction block of the current block to the residual block of the current block to obtain a reconstructed sample block.

Step 5

After all of the reconstructed sample blocks in the current picture are processed by loop filtering or other technologies, a final reconstructed picture is obtained.

Optionally, the reconstructed picture can be implemented as a video output or as a reference for subsequent decoding.

In this embodiment, a size of the template region used by the encoder or the decoder in the TMMIP technology can be preset according to the size of the current block. For example, in the template region, a width of a region adjacent to the top of the current block is equal to a width of the current block, and a height of the region adjacent to the top of the current block is equal to a height of two rows of samples. In the template region, a height of a region adjacent to the left of the current block is equal to a height of the current block, and a width of the region adjacent to the left of the current block is equal to a width of two columns of samples. Certainly, in other alternative embodiments, the size of the template region can also be implemented as other sizes, which is not limited in the present disclosure.

Embodiment 2

In this embodiment, in the optimal MIP mode derived from the template matching-based MIP mode derivation technology (i.e., TMMIP technology) and the prediction mode derived from the TIMD technology, the encoder or the decoder may determine the optimal prediction mode as the intra prediction mode of the current block. That is, the encoder or decoder may predict the picture block based on the TMMIP technology and the TIMD technology. For example, if the TIMD technology is enabled, at the sequence level and the block level, only one usage flag is required for the TMMIP technology and the TIMD technology to identify whether the TIMD or TMMIP technology is enabled. As illustrated in FIG. 3, the template region in the TIMD technology and the template region in the TMMIP technology can be set to be the same, that is, the region for calculating the distortion cost corresponding to the template region is the same, so the two technologies can be fused together for comparison. The TIMD technology derives the traditional intra prediction mode and the TMMIP technology derives the MIP mode and its corresponding transpose information.

The encoder traverses the prediction modes. If the intra mode is used for the current block, the encoder obtains the TIMD enable flag. The TIMD enable flag is a sequence level flag indicating that the encoder enables the TIMD technology currently, which can be in the form of sps_TIMD_enable_flag.

Exemplarily, the encoder can operate as follows.

Step 1

If the TIMD enable flag is true, the encoder tries the TIMD prediction method, i.e., the encoder performs Step 2. If the TIMD enable flag is false, the encoder does not try the TIMD prediction method, i.e., the encoder skips Step 2 and directly performs Step 3.

Step 2

Firstly, the encoder performs reconstructed-sample padding on a row and a column both adjacent to the outside of the template region. The padding process is the same as padding in an original intra prediction process. For example, the encoder can traverse and pad from the bottom-left corner to the top-right corner. If all of the reconstructed samples are available, padding is performed with all of the available reconstructed samples in sequence. If all of the reconstructed samples are unavailable, padding is performed with the average. If some of the reconstructed samples are available, padding is performed with the available reconstructed samples, and then for the rest of the unavailable reconstructed samples, the encoder can traverse in the order from the bottom-left corner to the top-right corner until the first available reconstructed sample appears, and then the previously unavailable position(s) is padded with the first available reconstructed sample.

Then, the encoder takes the reconstructed samples at the outside of the padded template region as inputs and predicts the samples in the template region in MIP modes that are allowed to be used.

Exemplarily, 16 MIP modes are available for a 4×4-sized block, 8 MIP modes are available for a block with a width or height of 4 or for an 8×8-sized block, and 6 MIP modes are available for blocks with other sizes. In addition, a block of any size can have an MIP transpose function, and the TMMIP prediction mode is the same as the MIP technology.

Exemplarily, the calculation on prediction includes the following. Firstly, the encoder performs Haar-downsampling on the reconstructed samples. For example, the encoder determines a down-sampling step size based on a block size. Secondly, the encoder adjusts, according to whether to transpose, a concatenation order of the down-sampled reconstructed samples on the top and the down-sampled reconstructed samples on the left. If not transposed, the down-sampled reconstructed samples on the left are concatenated to the end of the down-sampled reconstructed samples on the top, and the obtained vector is taken as an input. If transposed, the down-sampled reconstructed samples on the top are concatenated to the end of the down-sampled reconstructed samples on the left, and the obtained vector is taken as the input. Thirdly, the encoder obtains an MIP matrix coefficient by using the traversed prediction mode as the index. The encoder obtains the output vector based on the MIP matrix coefficient and the input. Finally, the encoder up-samples the output vector according to the number of samples of the output vector and the size of the current template. If up-sampling is not needed, the output vector is arranged in sequence in a horizontal direction to obtain a prediction block of the template. If up-sampling is needed, the output vector is up-sampled in the horizontal direction and then is up-sampled in a vertical direction, to up-sample to the same size as that of the template, so as to output the prediction block of the template region.

In addition, the encoder needs to try a TIMD template matching calculation process. In other words, the encoder obtains different interpolation filters according to indexes of different prediction modes, and obtains predicted samples in the template region by interpolating the reference samples.

Next, the encoder calculates the distortion cost based on the prediction block of the template region obtained by traversing each MIP mode and the reconstructed samples in the template region, and records the distortion cost in the prediction mode and in the transpose information. In addition, the encoder also needs to traverse all intra prediction modes allowed in TIMD, calculate the prediction block in the template, calculate the distortion cost based on the prediction block in the template and the reconstructed samples in the template, and record the distortion cost in each prediction mode. After traversing all allowed MIP modes and the transpose information and traversing the prediction modes allowed in TIMD, the encoder can select the optimal prediction mode according to the principle of minimum distortion cost. If the distortion cost of the MIP mode is minimum, the MIP mode and its corresponding transpose information are used as the optimal prediction mode of the current block. If the distortion cost of the TIMD mode is minimum, the TIMD mode is taken as the optimal prediction mode of the current block, the optimal intra prediction mode derived from the TIMD technology and its distortion cost are recorded, and the suboptimal prediction mode derived from the TIMD technology and its distortion cost are also recorded.

Finally, if the optimal prediction mode obtained by the encoder is the MIP mode, the encoder down-samples, according to the obtained optimal MIP mode and transpose information, the reconstructed samples adjacent to the top and the left of the current block, as appropriate, performs concatenation according to the transpose information to obtain the input vector, and reads a matrix coefficient corresponding to the current mode by using the MIP mode as an index. Then, the encoder obtains the output vector by calculating the input vector and the matrix coefficient. The encoder can transpose the output according to the transpose information, and up-sample the output vector according to the size of the current block and the number of samples of the output vector, to obtain an output of the same size as the current block as the prediction block of the current block. Based on this, the encoder obtains a rate-distortion cost corresponding to the current block, which is denoted as cost1.

Otherwise, the optimal prediction mode obtained by the encoder is the TIMD mode. If neither the optimal prediction mode nor the suboptimal prediction mode is a DC mode or a planar mode, and a distortion cost corresponding to the suboptimal prediction mode is less than twice a distortion cost corresponding to the optimal prediction mode, the encoder needs to fuse the prediction blocks. In other words, firstly, the encoder obtains interpolation filtering coefficients according to the optimal prediction mode, and performs interpolation filtering on the reconstructed samples adjacent to the top and left of the current block to obtain the predicted samples at all positions in the current block, which is denoted as the optimal prediction block. Secondly, the encoder obtains interpolation filtering coefficients according to the suboptimal prediction mode, and performs interpolation filtering on the reconstructed samples adjacent to the top and left of the current block to obtain the predicted samples at all positions in the current block, which is denoted as the suboptimal prediction block. Thirdly, the encoder obtains a weighted value of the optimal prediction block and a weighted value of the suboptimal prediction block based on the ratio of the distortion cost corresponding to the optimal prediction mode to the distortion cost corresponding to the suboptimal prediction mode. Finally, the encoder performs weighted fusion on the optimal prediction block and the suboptimal prediction block to obtain the prediction block of the current block as an output. If the optimal prediction mode or the suboptimal prediction mode is the DC mode or the planar mode, or if the distortion cost corresponding to the suboptimal prediction mode is greater than twice the distortion cost corresponding to the optimal prediction mode, the encoder does not need to fuse the prediction blocks, but only determines the optimal prediction block obtained by performing interpolation filtering on the reconstructed samples adjacent to the top and left of the current block in the optimal prediction mode as the prediction block of the current block. Based on this, the encoder obtains a rate-distortion cost corresponding to the current block, which is denoted as cost1.

Step 3

The encoder continues to traverse other intra prediction technologies and calculates corresponding rate-distortion costs denoted as cost2, . . . , costN.

Step 4

If cost1 is the minimum one of all rate-distortion costs, the encoder allows the TIMD technology to be used in the current block, and set the TIMD usage flag of the current block to be true and signals it into the bitstream. It should be noted that, in the embodiment, the encoder allows to use the TIMD technology in the current block, which can be understood as follows. The encoder allows to use the TIMD technology or the TMMIP technology in the current block. Whether the TIMD technology or the TMMIP technology is allowed to be used can be determined based on the cost information. If cost1 is not the minimum rate-distortion cost, the encoder uses other intra prediction technologies in the current block, and sets the TIMD usage flag of the current block to be false and signals it into the bitstream. It should be understood that information such as flags or indexes of other intra prediction technologies is transmitted according to definition and is not elaborated herein.

The encoder determines the residual block of the current block based on the prediction block of the current block and the original block of the current block, and performs operations such as transform and quantization, entropy coding, loop filtering, etc., on the residual block of the current block. It can be understood that for the specific process, reference can be made to related contents of the above, which is not repeated herein for simplicity.

The related solutions of the decoder in embodiments of the present disclosure are described below.

The decoder parses a block-level flag. If an intra mode is used for the current block, the decoder parses or obtains a TIMD enable flag which is a sequence-level flag, indicating that the decoder enables the TIMD technology currently.

Exemplarily, the decoder can operate as follows.

Step 1

If TIMD enable flag is true, the decoder parses the TIMD usage flag of the current block. Otherwise, in a current decoding process, the block-level TIMD usage flag does not need to be decoded, and the block-level TIMD usage flag is false by default. If the TIMD usage flag of the current block is true, Step 2 is performed. Otherwise, Step 3 is performed.

Step 2

Firstly, the decoder performs reconstructed-sample padding on a row and a column both adjacent to the outside of the template region. The padding process is the same as padding in an original intra prediction process. For example, the decoder can traverse and pad from the bottom-left corner to the top-right corner. If all of the reconstructed samples are available, padding is performed with all of the available reconstructed samples in sequence. If all of the reconstructed samples are unavailable, padding is performed with the average. If some of the reconstructed samples are available, padding is performed with the available reconstructed samples, and then for the rest of the unavailable reconstructed samples, the decoder can traverse in the order from the bottom-left corner to the top-right corner until the first available reconstructed sample appears, and then the previously unavailable position(s) is padded with the first available reconstructed sample.

Then, the decoder takes the reconstructed samples at the outside of the padded template region as inputs and predicts the samples in the template region in MIP modes that are allowed to be used.

Exemplarily, 16 MIP modes are available for a 4×4-sized block, 8 MIP modes are available for a block with a width or height of 4 or for an 8×8-sized block, and 6 MIP modes are available for blocks with other sizes. In addition, a block of any size can have an MIP transpose function, and the TMMIP prediction mode is the same as the MIP technology.

Exemplarily, the calculation on prediction includes the following. Firstly, the decoder performs Haar-downsampling on the reconstructed samples. For example, the decoder determines a down-sampling step size based on a block size. Secondly, the decoder adjusts, according to whether to transpose, a concatenation order of the down-sampled reconstructed samples on the top and the down-sampled reconstructed samples on the left. If not transposed, the down-sampled reconstructed samples on the left are concatenated to the end of the down-sampled reconstructed samples on the top, and the obtained vector is taken as an input. If transposed, the down-sampled reconstructed samples on the top are concatenated to the end of the down-sampled reconstructed samples on the left, and the obtained vector is taken as the input. Thirdly, the decoder obtains an MIP matrix coefficient by using the traversed prediction mode as the index. The decoder obtains the output vector based on the MIP matrix coefficient and the input. Finally, the decoder up-samples the output vector according to the number of samples of the output vector and the size of the current template. If up-sampling is not needed, the output vector is arranged in sequence in a horizontal direction to obtain a prediction block of the template. If up-sampling is needed, the output vector is up-sampled in the horizontal direction and then is up-sampled in a vertical direction, to up-sample to the same size as that of the template, so as to output the prediction block of the template region.

In addition, the decoder needs to try the TIMD template matching calculation process. In other words, the decoder obtains different interpolation filters according to indexes of different prediction modes, and obtains predicted samples in the template region by interpolating the reference samples.

Next, the decoder calculates the distortion cost based on the prediction block of the template region obtained by traversing each MIP mode and the reconstructed samples in the template region, and records the distortion cost in the prediction mode and in the transpose information. In addition, the decoder also needs to traverse all intra prediction modes allowed in TIMD, calculate the prediction block in the template, calculate the distortion cost based on the prediction block in the template and the reconstructed samples in the template, and record the distortion cost in each prediction mode. After traversing all allowed MIP modes and the transpose information and traversing the prediction modes allowed in TIMD, the decoder can select the optimal prediction mode according to the principle of minimum distortion cost. If the distortion cost of the MIP mode is minimum, the MIP mode and its corresponding transpose information are used as the optimal prediction mode of the current block. If the distortion cost of the TIMD mode is minimum, the TIMD mode is taken as the optimal prediction mode of the current block, the optimal intra prediction mode derived from the TIMD technology and its distortion cost are recorded, and the suboptimal prediction mode derived from the TIMD technology and its distortion cost are also recorded.

Finally, if the optimal prediction mode obtained by the decoder is the MIP mode, the decoder down-samples, according to the obtained optimal MIP mode and transpose information, the reconstructed samples adjacent to the top and the left of the current block, as appropriate, performs concatenation according to the transpose information to obtain the input vector, and reads a matrix coefficient corresponding to the current mode by using the MIP mode as an index. Then, the decoder obtains the output vector by calculating the input vector and the matrix coefficient. The decoder can transpose the output according to the transpose information, and up-sample the output vector according to the size of the current block and the number of samples of the output vector, to obtain an output of the same size as the current block as the prediction block of the current block.

Otherwise, the optimal prediction mode obtained by the decoder is the TIMD mode. If neither the optimal prediction mode nor the suboptimal prediction mode is a DC mode or a planar mode, and a distortion cost corresponding to the suboptimal prediction mode is less than twice a distortion cost corresponding to the optimal prediction mode, the decoder needs to fuse the prediction blocks. In other words, firstly, the decoder obtains interpolation filtering coefficients according to the optimal prediction mode, and performs interpolation filtering on the reconstructed samples adjacent to the top and left of the current block to obtain the predicted samples at all positions in the current block, which is denoted as the optimal prediction block. Secondly, the decoder obtains interpolation filtering coefficients according to the suboptimal prediction mode, and performs interpolation filtering on the reconstructed samples adjacent to the top and left of the current block to obtain the predicted samples at all positions in the current block, which is denoted as the suboptimal prediction block. Thirdly, the decoder obtains a weighted value of the optimal prediction block and a weighted value of the suboptimal prediction block based on the ratio of the distortion cost corresponding to the optimal prediction mode to the distortion cost corresponding to the suboptimal prediction mode. Finally, the decoder performs weighted fusion on the optimal prediction block and the suboptimal prediction block to obtain the prediction block of the current block as an output. If the optimal prediction mode or the suboptimal prediction mode is the DC mode or the planar mode, or if the distortion cost corresponding to the suboptimal prediction mode is greater than twice the distortion cost corresponding to the optimal prediction mode, the decoder does not need to fuse the prediction blocks, but only determines the optimal prediction block obtained by performing interpolation filtering on the reconstructed samples adjacent to the top and left of the current block in the optimal prediction mode as the prediction block of the current block.

Step 3

The decoder continues to parse information such as the usage flags or the indexes for other intra prediction technologies and obtains the final prediction block of the current block according to the parsed information.

Step 4

The decoder parses the bitstream and obtains a frequency-domain residual block (also referred to as "frequency-domain residual information") of the current block, and performs inverse quantization and inverse transformation on the frequency-domain residual block of the current block to obtain the residual block of the current block (also referred to as "temporal residual block" or "temporal residual information"). Then, the decoder adds the prediction block of the current block to the residual block of the current block to obtain a reconstructed sample block.

Step 5

After all of the reconstructed sample blocks in the current picture are processed by loop filtering or other technologies, a final reconstructed picture is obtained.

Optionally, the reconstructed picture can be implemented as a video output or as a reference for subsequent decoding.

In this embodiment, for a calculation process of weights for performing weighted fusion on the TIMD prediction block, reference can be made to descriptions of the TIMD technical introduction, which is not repeated herein for simplicity. In addition, the encoder or the decoder can preset the size of the template region used in the TMMIP technology according to the size of the current block. For example, if the MIP mode is an optimal prediction mode or a suboptimal prediction mode, a weighted fusion operation may be performed. Furthermore, the definition of the template region in the TMMIP technology can be consistent with or different from the definition of the template region in the TIMD technology. For example, if the width of the current block is less than or equal to 8, the height of the region adjacent to the top of the current block in the template region is equal to the height of two rows of samples. Otherwise, the height is equal to a height of four rows of samples. Similarly, if the height of the current block is less than or equal to 8, the width of the region adjacent to the left of the current block in the template region is equal to a width of two columns of samples. Otherwise, the width is equal to a width of four columns of samples.

The preferred embodiments of the present disclosure are described in detail above in conjunction with the accompanying drawings. However, the present disclosure is not limited to the specific details in the above implementations. Within the technical conception of the present disclosure, various simple variants of technical solutions of the present disclosure can be made, and these simple variants all fall within the protection scope of the present disclosure. For example, each specific technical feature described in the above implementations can be combined in any suitable way without contradiction, and to avoid unnecessary repetition, the various possible combinations are not described separately in the present disclosure. For example, various embodiments of the present disclosure can also be combined in any way, and as long as they do not contradict the idea of the present disclosure, they can also be considered as disclosed in the present disclosure. It can also be understood that in the various method embodiments of the present disclosure, the numbering of each process mentioned above does not imply the order of execution, and the order of execution of each process shall be determined by its function and inherent logic, which shall not constitute any limitation to the implementation process of the embodiments of the present disclosure.

Method embodiments of the present disclosure are described in detail above, and apparatus embodiments of the present disclosure are described in detail below in connection with FIG. 7 to FIG. 9.

Figures 7, 8:
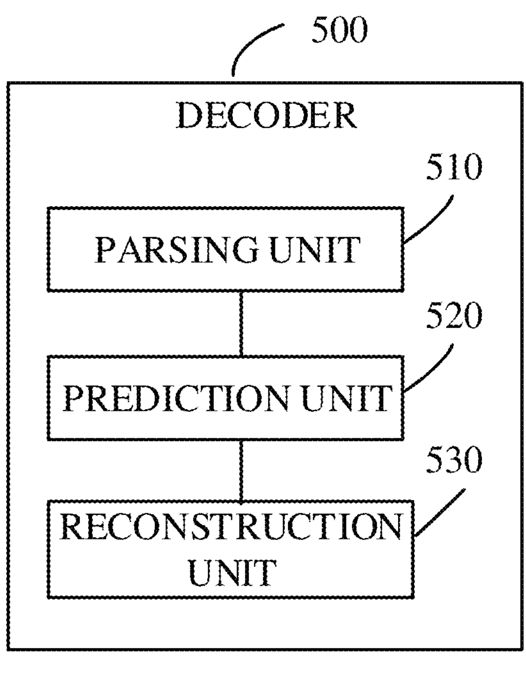
FIG. 7 is a schematic block diagram of a decoder provided in embodiments of the present disclosure.
FIG. 8 is a schematic block diagram of an encoder provided in embodiments of the present disclosure.

FIG. 7 is a schematic block diagram of a decoder 500 provided in embodiments of the present disclosure.

As illustrated in FIG. 7, the decoder 500 can include a parsing unit 510, a prediction unit 520, and a reconstruction unit 530. The parsing unit 510 is configured to parse a bitstream to obtain a residual block of a current block in a current sequence. The prediction unit 520 is configured to determine, based on distortion costs corresponding to multiple MIP modes, an optimal MIP mode for predicting the current block, where the distortion costs corresponding to the multiple MIP modes include distortion costs obtained by predicting samples in a template region adjacent to the current block in the multiple MIP modes. The prediction unit 520 is configured to determine an intra prediction mode of the current block based on the optimal MIP mode. The prediction unit 520 is configured to predict the current block in the intra prediction mode of the current block, to obtain a prediction block of the current block. The reconstruction unit 530 is configured to obtain a reconstructed block of the current block based on the residual block of the current block and the prediction block of the current block.

In some embodiments, the prediction unit 520 is specifically configured to parse the bitstream of the current sequence to obtain a first flag. The prediction unit 520 is specifically configured to determine the optimal MIP mode based on the distortion costs corresponding to the multiple MIP modes when the first flag indicates that the optimal MIP mode is allowed to be used for predicting a picture block in the current sequence.

In some embodiments, the prediction unit 520 is specifically configured to parse the bitstream to obtain a second flag when the first flag indicates that the optimal MIP mode is allowed to be used for predicting the picture block in the current sequence. The prediction unit 520 is specifically configured to determine the optimal MIP mode based on the distortion costs corresponding to the multiple MIP modes when the second flag indicates that the optimal MIP mode is allowed to be used for predicting the current block.

In some embodiments, the parsing unit 510 is further configured to determine an arrangement order of the multiple MIP modes based on the distortion costs corresponding to the multiple MIP modes. The parsing unit 510 is further configured to determine a coding manner used for the optimal MIP mode based on the arrangement order of the multiple MIP modes. The parsing unit 510 is further configured to decode the bitstream of the current sequence based on the coding manner used for the optimal MIP mode to obtain an index of the optimal MIP mode.

In some embodiments, a codeword length of a coding manner used for each of first n MIP modes in the arrangement order is less than a codeword length of a coding manner used for each of MIP modes following the n-th MIP mode in the arrangement order.

Additionally/Alternatively, variable-length coding is used for the first n MIP modes, and TB encoding is used for the MIP modes following the n-th MIP mode.

In some embodiments, the prediction unit 520 is specifically configured to determine the optimal MIP mode as the intra prediction mode of the current block.

In some embodiments, the prediction unit 520 is specifically configured to: predict the current block in the optimal MIP mode, to obtain a first prediction block; predict the current block in a TIMD mode, to obtain a second prediction block; and determine, based on a distortion cost of the first prediction block and a distortion cost of the second prediction block, a prediction mode having a smaller distortion cost between the optimal MIP mode and the TIMD mode as the intra prediction mode of the current block.

In some embodiments, the prediction unit 520 is specifically configured to predict the samples in the template region based on a third flag and the multiple MIP modes to obtain distortion costs corresponding to the multiple MIP modes in each state of the third flag, where the third flag indicates whether an input vector and an output vector corresponding to an MIP mode are transposed. The prediction unit 520 is specifically configured to determine the optimal MIP mode based on the distortion costs corresponding to the multiple MIP modes in each state of the third flag.

In some embodiments, the prediction unit 520 is specifically configured to determine the optimal MIP mode based on the distortion costs corresponding to the multiple MIP modes when a size of the current block is a preset size.

In some embodiments, the prediction unit 520 is specifically configured to determine the optimal MIP mode based on the distortion costs corresponding to the multiple MIP modes when a frame containing the current block is an I-frame and the size of the current block is the preset size.

In some embodiments, the prediction unit 520 is specifically configured to determine the optimal MIP mode based on the distortion costs corresponding to the multiple MIP modes when the frame containing the current block is a B-frame.

In some embodiments, before the optimal MIP mode for predicting the current block is determined based on the distortion costs corresponding to the multiple MIP modes, the prediction unit 520 is further configured to obtain MIP modes used for a neighbouring block adjacent to the current block. The prediction unit 520 is further configured to determine the MIP modes used for the neighbouring block as the multiple MIP modes.

In some embodiments, before the optimal MIP mode for predicting the current block is determined based on the distortion costs corresponding to the multiple MIP modes, the prediction unit 520 is further configured to perform reconstructed-sample padding on a reference region adjacent to the outside of the template region to obtain a reference row and a reference column of the template region. The prediction unit 520 is further configured to predict the samples in the template region in the multiple MIP modes respectively with the reference row and the reference column as inputs to obtain multiple prediction blocks corresponding to the multiple MIP modes. The prediction unit 520 is further configured to determine the distortion costs corresponding to the multiple MIP modes based on the multiple prediction blocks and a reconstructed block of the template region.

In some embodiments, the prediction unit 520 is specifically configured to down-sample the reference row and the reference column to obtain an input vector. The prediction unit 520 is specifically configured to predict the samples in the template region by traversing the multiple MIP modes with the input vector as an input, to obtain output vectors corresponding to the multiple MIP modes. The prediction unit 520 is specifically configured to up-sample the output vectors corresponding to the multiple MIP modes to obtain the prediction blocks corresponding to the multiple MIP modes.

In some embodiments, the prediction unit 520 is specifically configured to determine the optimal MIP mode based on SATDs corresponding to the multiple MIP modes in the template region.

FIG. 8 is a schematic block diagram of an encoder 600 provided in embodiments of the present disclosure.

As illustrated in FIG. 8, the encoder 600 can include a prediction unit 610, a residual unit 620, and an encoding unit 630. The prediction unit 610 is configured to determine, based on distortion costs corresponding to MIP modes, an optimal MIP mode for predicting a current block in a current sequence, where the distortion costs corresponding to the multiple MIP modes include distortion costs obtained by predicting samples in a template region adjacent to the current block in the multiple MIP modes. The prediction unit 610 is configured to determine an intra prediction mode of the current block based on the optimal MIP mode. The prediction unit 610 is configured to predict the current block in the intra prediction mode of the current block, to obtain a prediction block of the current block. The residual unit 620 is configured to obtain a residual block of the current block based on the prediction block of the current block and an original block of the current block. The encoding unit 630 is configured to encode the residual block of the current block to obtain a bitstream of the current sequence.

In some embodiments, the prediction unit 610 is specifically configured to obtain a first flag. The prediction unit 610 is specifically configured to determine the optimal MIP mode based on the distortion costs corresponding to the multiple MIP modes when the first flag indicates that the optimal MIP mode is allowed to be used for predicting a picture block in the current sequence. The encoding unit 630 is specifically configured to encode the residual block of the current block and the first flag to obtain the bitstream.

In some embodiments, the prediction unit 610 is specifically configured to: determine an optimal prediction mode based on the optimal MIP mode when the first flag indicates that the optimal MIP mode is allowed to be used for predicting the picture block in the current sequence; predict the current block in the optimal prediction mode, to obtain a first rate-distortion cost; predict the current block in at least one intra prediction mode to obtain at least one rate-distortion cost; and when the first rate-distortion cost is less than or equal to a minimum of the at least one rate-distortion cost, determine the optimal prediction mode as the intra prediction mode of the current block. The encoding unit 630 is specifically configured to encode the residual block of the current block, the first flag, and a second flag to obtain the bitstream. When the first rate-distortion cost is less than or equal to the minimum of the at least one rate-distortion cost, the second flag indicates that the optimal MIP mode is allowed to be used for predicting the current block. When the first rate-distortion cost is greater than the minimum of the at least one rate-distortion cost, the second flag indicates that the optimal MIP mode is not allowed to be used for predicting the current block.

In some embodiments, the prediction unit 610 is specifically configured to determine the optimal MIP mode as the optimal prediction mode.

In some embodiments, the prediction unit 610 is specifically configured to: predict the current block in the optimal MIP mode, to obtain a first prediction block; predict the current block in a TIMD mode, to obtain a second prediction block; and determine, based on a distortion cost of the first prediction block and a distortion cost of the second prediction block, a prediction mode having a smaller distortion cost between the optimal MIP mode and the TIMD mode as the optimal prediction mode.

In some embodiments, the encoding unit 630 is specifically configured to determine an arrangement order of the multiple MIP modes based on the distortion costs corresponding to the multiple MIP modes. The encoding unit 630 is specifically configured to determine a coding manner used for the optimal MIP mode based on the arrangement order of the multiple MIP modes. The encoding unit 630 is specifically configured to encode the residual block of the current block and encode an index of the optimal MIP mode in the coding manner used for the optimal MIP mode to obtain the bitstream.

In some embodiments, a codeword length of a coding manner used for each of first n MIP modes in the arrangement order is less than a codeword length of a coding manner used for each of MIP modes following the n-th MIP mode in the arrangement order.

Additionally/Alternatively, variable-length coding is used for the first n MIP modes, and TB encoding is used for the MIP modes following the n-th MIP mode.

In some embodiments, the prediction unit 610 is specifically configured to determine the optimal MIP mode as the intra prediction mode of the current block.

In some embodiments, the prediction unit 610 is specifically configured to predict the samples in the template region based on a third flag and the multiple MIP modes to obtain distortion costs corresponding to the multiple MIP modes in each state of the third flag, where the third flag indicates whether an input vector and an output vector corresponding to an MIP mode are transposed. The prediction unit 610 is specifically configured to determine the optimal MIP mode based on the distortion costs corresponding to the multiple MIP modes in each state of the third flag.

In some embodiments, the prediction unit 610 is specifically configured to determine the optimal MIP mode based on the distortion costs corresponding to the multiple MIP modes when a size of the current block is a preset size.

In some embodiments, the prediction unit 610 is specifically configured to determine the optimal MIP mode based on the distortion costs corresponding to the multiple MIP modes when a frame containing the current block is an I-frame and the size of the current block is the preset size.

In some embodiments, the prediction unit 610 is specifically configured to determine the optimal MIP mode based on the distortion costs corresponding to the multiple MIP modes when the frame containing the current block is a B-frame.

In some embodiments, before the optimal MIP mode for predicting the current block is determined based on the distortion costs corresponding to the multiple MIP modes, the prediction unit 610 is further configured to obtain MIP modes used for a neighbouring block adjacent to the current block. The prediction unit 610 is further configured to determine the MIP modes used for the neighbouring block as the multiple MIP modes.

In some embodiments, before the optimal MIP mode for predicting the current block is determined based on the distortion costs corresponding to the multiple MIP modes, the prediction unit 610 is further configured to perform reconstructed-sample padding on a reference region adjacent to the outside of the template region to obtain a reference row and a reference column of the template region. The prediction unit 610 is further configured to predict the samples in the template region in the multiple MIP modes respectively with the reference row and the reference column as inputs to obtain multiple prediction blocks corresponding to the multiple MIP modes. The prediction unit 610 is further configured to determine the distortion costs corresponding to the multiple MIP modes based on the multiple prediction blocks and a reconstructed block of the template region.

In some embodiments, the prediction unit 610 is specifically configured to down-sample the reference row and the reference column to obtain an input vector. The prediction unit 610 is specifically configured to predict the samples in the template region by traversing the multiple MIP modes with the input vector as an input, to obtain output vectors corresponding to the multiple MIP modes. The prediction unit 610 is specifically configured to up-sample the output vectors corresponding to the multiple MIP modes to obtain the prediction blocks corresponding to the multiple MIP modes.

In some embodiments, the prediction unit 610 is specifically configured to determine the optimal MIP mode based on SATDs corresponding to the multiple MIP modes in the template region.

It can be understood that the apparatus embodiments and the method embodiments can correspond to each other, and similar descriptions can refer to the method embodiments. To avoid repetition, details are not repeated herein. Specifically, the decoder 500 illustrated in FIG. 7 can execute the method 300 in embodiments of the present disclosure, and the aforementioned and other operations and/or functions of each unit in the decoder 500 are configured to implement related operations of various methods such as the method 300. Similarly, the encoder 600 illustrated in FIG. 8 can execute the method 400 in embodiments of the present disclosure, and the aforementioned and other operations and/or functions of each unit in the encoder 600 are configured to implement related operations of various methods such as the method 400.

It is further to be understood that units of the decoder 500 or the encoder 600 involved in the embodiments of the present disclosure can be separately or wholly combined into one or several other units, or one (or more) of the units herein can further be partitioned into multiple units of smaller functions. In this way, same operations can be implemented, and implementation of the technical effects of the embodiments of the present disclosure is not affected. The foregoing units are partitioned based on logical functions. In an actual implementation, a function of one unit can also be implemented by multiple units, or functions of multiple units are implemented by one unit. In other embodiments of the present disclosure, the decoder 500 or the encoder 600 can also include other units. During the actual implementation, the functions can also be cooperatively implemented by other units and can be cooperatively implemented by multiple units. According to another embodiment of the present disclosure, computer programs (including program codes) that can perform the operations involved in the corresponding method can be run on a general computing device such as a general computer, which includes processing elements and storage elements such as a central processing unit (CPU), a random access memory (RAM), and a read-only memory (ROM), to construct the decoder 500 or the encoder 600 involved in the embodiments of the present disclosure and implement the encoding method and the decoding method provided in the embodiments of the present disclosure. The computer programs can be recorded in, for example, a computer-readable storage medium, and can be loaded into any electronic device having a processing capability through the computer-readable storage medium, and run in the electronic device, to implement the corresponding method in the embodiments of the present disclosure.

In other words, the units mentioned above can be implemented in the form of hardware, can be implemented by instructions in the form of software, or can be implemented in the form of a combination of software and hardware. Specifically, the operations of the method embodiments in the embodiments of the present disclosure can be completed by a hardware integrated logical circuit in a processor, and/or by using instructions in a form of software. The operations of the methods disclosed with reference to the embodiments of the present disclosure can be directly performed and completed by using a hardware decoding processor, or can be performed and completed by using a combination of hardware and software in the decoding processor. Optionally, the software can be located in a mature storage medium in the field, such as a random access memory, a flash memory, a read-only memory, a programmable read-only memory, an electrically-erasable programmable memory, or a register. The storage medium is located in the memory. The processor reads information in the memory and completes the operations of the foregoing method embodiments in combination with hardware thereof.

Figure 9:
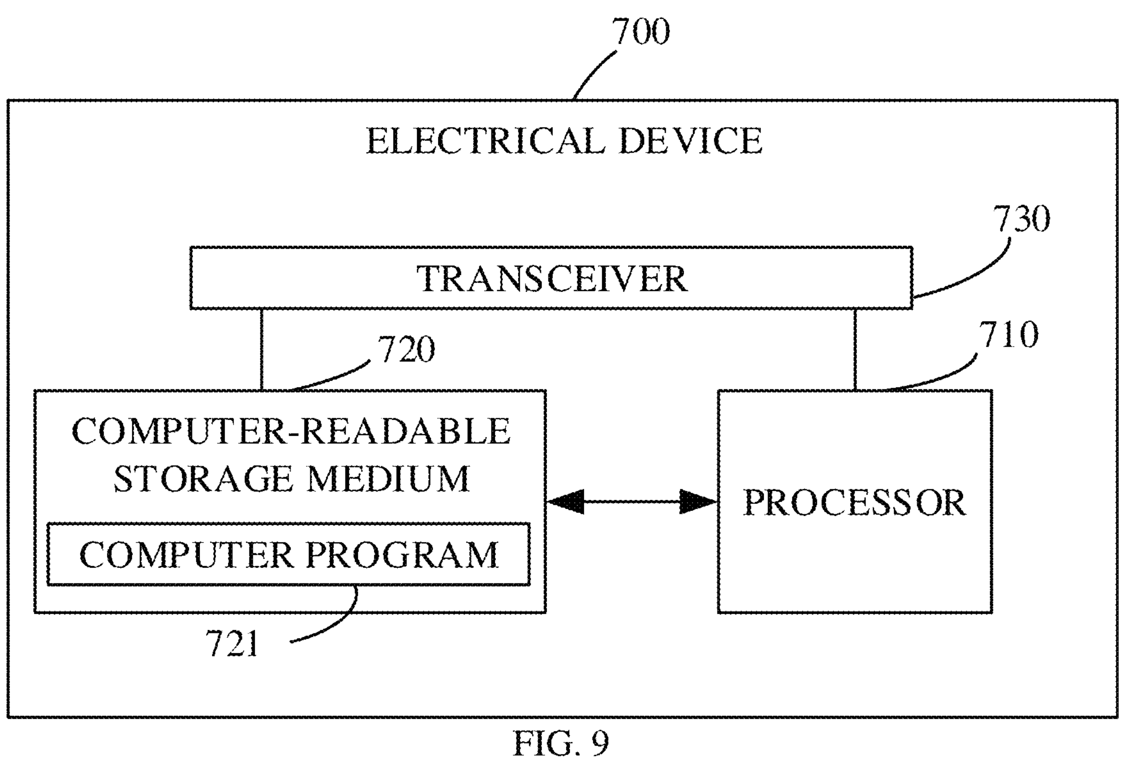
FIG. 9 is a schematic block diagram of an electronic device provided in embodiments of the present disclosure.

FIG. 9 is a schematic structural diagram of an electronic device 700 provided in embodiments of the present disclosure.

As illustrated in FIG. 9, the electronic device 700 at least includes a processor 710, a computer-readable storage medium 720, and a transceiver 730. The processor 710, the computer-readable storage medium 720, and the transceiver 730 can be connected to each other through a bus or in another manner. The computer-readable storage medium 720 is configured to store computer programs 721 and the computer programs 721 include computer instructions, and the processor 710 is configured to execute the computer instructions stored in the computer-readable storage medium 720. The processor 710 is the computing core and control core of the electronic device 700. The processor 710 is suitable for implementing one or more computer instructions, and are suitable for loading and executing the one or more compute instructions to implement a corresponding method procedure or a corresponding function.

As an example, the processor 710 can also be called a CPU. The processor 710 includes but is not limited to: a general processor, a digital signal processor (DSP), an application-specific integrated circuit (ASIC), a field programmable gate array (FPGA), or another programmable logic device, a discrete gate, a transistor logic device, or a discrete hardware component.

As an example, the computer-readable storage medium 720 can be a high-speed RAM memory, or can be a non-volatile memory, such as at least one magnetic disk memory. Optionally, the computer-readable storage medium 720 can be at least one computer-readable storage medium far away from the processor 710. Specifically, the computer-readable storage medium 720 includes, but is not limited to, a volatile memory and/or a non-volatile memory. The non-volatile memory can be an ROM, a programmable read-only memory (PROM), an erasable programmable read-only memory (EPROM), an electrically erasable programmable read-only memory (EEPROM), or a flash memory. The volatile memory can be an RAM, used as an external cache. Through exemplary but not limitative description, many forms of RAMs can be used, for example, a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchronous link dynamic random access memory (synch link DRAM, SLDRAM), and a direct Rambus dynamic random access memory (direct Rambus RAM, DR RAM).

In an implementation, the electronic device 700 can be the encoder or the encoding framework involved in embodiments of the present disclosure. The computer-readable storage medium 720 stores a first computer instruction. The first computer instruction stored in the computer-readable storage medium 720 is loaded and executed by the processor 710, to implement corresponding steps in the encoding method provided in embodiments of the present disclosure. In other words, the first computer instruction in the computer-readable storage medium 720 is loaded and executed by the processor 710 to perform corresponding steps. To avoid repetition, details are not described herein again.

In an implementation, the electronic device 700 can be the decoder or the decoding framework involved in embodiments of the present disclosure. The computer-readable storage medium 720 stores a second computer instruction. The second computer instruction stored in the computer-readable storage medium 720 is loaded and executed by the processor 710, to implement corresponding steps in the decoding method provided in embodiments of the present disclosure. In other words, the second computer instruction in the computer-readable storage medium 720 is loaded and executed by the processor 710 to perform corresponding steps. To avoid repetition, details are not described herein again.

According to another aspect of the present disclosure, embodiments of the present disclosure further provide a coding system. The coding system includes the decoder and the encoder.

According to another aspect of the present disclosure, embodiments of the present disclosure further provide a computer-readable storage medium (e.g., memory). The computer-readable storage medium is a memory device in the electronic device 700, and is configured to store programs and data. For example, the computer-readable storage medium is the computer-readable storage medium 720. It can be understood that the computer-readable storage medium 720 herein can include an internal storage medium in the electronic device 700, and can also include an extended storage medium supported by the electronic device 700. The computer-readable storage medium provides a storage space, and the storage space stores an operating system of the electronic device 700. In addition, the storage space further stores one or more computer instructions suitable for being loaded and executed by the processor 710, and the one or more computer instructions can be the one or more computer programs 721 (including program codes).

According to another aspect of the present disclosure, a computer program product or a computer program is provided. The computer program product or the computer program includes computer instructions, and the computer instructions are stored in a computer-readable storage medium. For example, the computer instructions are the computer program 721. In this case, the electronic device 700 can be a computer, the processor 710 reads the computer instructions from the computer-readable storage medium 720, and executes the computer instructions, to cause the computer to perform the encoding method or decoding method provided in the various implementations.

In other words, when software is used to implement the implementations, the implementations can be implemented completely or partially in a form of a computer program product. The computer program product includes one or more computer instructions. When the compute instructions are loaded and executed on the computer, the procedure of the embodiments of the present disclosure is completely or partially run or functions of the embodiments of the present disclosure are completely or partially implemented. The computer can be a general-purpose computer, a special-purpose computer, a computer network, or another programmable apparatus. The computer instructions can be stored in a computer-readable storage medium or transmitted from one computer-readable storage medium to another computer-readable storage medium. For example, the computer instructions can be transmitted from one website, computer, server, or data center to another website, computer, server, or data center in a wired (for example, a coaxial cable, an optical fiber or a digital subscriber line (DSL)) or wireless (for example, infrared, wireless or microwave) manner.

A person of ordinary skill in the art can be aware that, the units and process steps of the examples described with reference to the implementations disclosed in the present disclosure can be implemented in electronic hardware, or a combination of computer software and electronic hardware. Whether the functions are executed by hardware or software depends on particular applications and design constraint conditions of the technical solutions. A person skilled in the art can use different methods to implement the described functions for each particular application, but it cannot be considered that the implementation goes beyond the scope of the present disclosure.

Finally, the contents are merely embodiments of the present disclosure, but are not intended to limit the protection scope of the present disclosure. Any variation or substitution readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A decoding method, applicable to a decoder and comprising:

parsing a bitstream to obtain a residual block of a current block;

determining, based on distortion costs corresponding to a plurality of matrix based intra prediction (MIP) modes, an optimal MIP mode for predicting the current block, wherein the distortion costs corresponding to the plurality of MIP modes comprise distortion costs obtained by predicting samples in a template region adjacent to the current block in the plurality of MIP modes;

determining the optimal MIP mode as an intra prediction mode of the current block;

predicting the current block in the intra prediction mode of the current block, to obtain a prediction block of the current block; and obtaining a reconstructed block of the current block based on the residual block of the current block and the prediction block of the current block.

2. The method of claim 1, wherein determining, based on the distortion costs corresponding to the plurality of MIP modes, the optimal MIP mode for predicting the current block comprises:

parsing the bitstream to obtain a first flag; and in response to the first flag indicating that the optimal MIP mode is allowed to be used for predicting a picture block, determining the optimal MIP mode based on the distortion costs corresponding to the plurality of MIP modes.

3. The method of claim 2, wherein in response to the first flag indicating that the optimal MIP mode is allowed to be used for predicting the picture block, determining the optimal MIP mode based on the distortion costs corresponding to the plurality of MIP modes comprises:

in response to the first flag indicating that the optimal MIP mode is allowed to be used for predicting the picture block, parsing the bitstream to obtain a second flag; and in response to the second flag indicating that the optimal MIP mode is allowed to be used for predicting the current block, determining the optimal MIP mode based on the distortion costs corresponding to the plurality of MIP modes.

4. The method of claim 1, further comprising:

determining an arrangement order of the plurality of MIP modes based on the distortion costs corresponding to the plurality of MIP modes;

determining a coding manner used for the optimal MIP mode based on the arrangement order of the plurality of MIP modes; and decoding the bitstream based on the coding manner used for the optimal MIP mode, to obtain an index of the optimal MIP mode.

5. The method of claim 1, wherein determining, based on the distortion costs corresponding to the plurality of MIP modes, the optimal MIP mode for predicting the current block comprises:

predicting the samples in the template region based on a third flag and the plurality of MIP modes, to obtain distortion costs corresponding to the plurality of MIP modes in each state of the third flag, wherein the third flag indicates whether an input vector and an output vector corresponding to an MIP mode are transposed; and determining the optimal MIP mode based on the distortion costs corresponding to the plurality of MIP modes in each state of the third flag.

6. The method of claim 1, wherein before determining, based on the distortion costs corresponding to the plurality of MIP modes, the optimal MIP mode for predicting the current block, the method further comprises:

obtaining MIP modes used for a neighbouring block adjacent to the current block; and determining the MIP modes used for the neighbouring block as the plurality of MIP modes.

7. The method of claim 1, wherein before determining, based on the distortion costs corresponding to the plurality of MIP modes, the optimal MIP mode for predicting the current block, the method further comprises:

performing reconstructed-sample padding on a reference region adjacent to the template region, to obtain a reference row and a reference column of the template region;

predicting the samples in the template region in the plurality of MIP modes respectively with the reference row and the reference column as inputs, to obtain a plurality of prediction blocks corresponding to the plurality of MIP modes; and determining the distortion costs corresponding to the plurality of MIP modes based on the plurality of prediction blocks and a reconstructed block of the template region.

8. The method of claim 1, wherein determining, based on the distortion costs corresponding to the plurality of MIP modes, the optimal MIP mode for predicting the current block comprises:

determining the optimal MIP mode based on sums of absolute transformed difference (SATD) corresponding to the plurality of MIP modes in the template region.

9. An encoding method, applicable to an encoder and comprising:

determining, based on distortion costs corresponding to a plurality of matrix based intra prediction (MIP) modes, an optimal MIP mode for predicting a current block, wherein the distortion costs corresponding to the plurality of MIP modes comprise distortion costs obtained by predicting samples in a template region adjacent to the current block in the plurality of MIP modes;

determining the optimal MIP mode as an intra prediction mode of the current block;

predicting the current block in the intra prediction mode of the current block, to obtain a prediction block of the current block;

obtaining a residual block of the current block based on the prediction block of the current block and an original block of the current block; and encoding the residual block of the current block to obtain a bitstream.

10. The method of claim 9, wherein determining, based on the distortion costs corresponding to the plurality of MIP modes, the optimal MIP mode for predicting the current block comprises:

obtaining a first flag; and in response to the first flag indicates that the optimal MIP mode is allowed to be used for predicting a picture block, determining the optimal MIP mode based on the distortion costs corresponding to the plurality of MIP modes; and encoding the residual block of the current block to obtain the bitstream comprises:

encoding the residual block of the current block and the first flag to obtain the bitstream.

11. The method of claim 9, wherein encoding the residual block of the current block to obtain the bitstream comprises:

determining an arrangement order of the plurality of MIP modes based on the distortion costs corresponding to the plurality of MIP modes;

determining a coding manner used for the optimal MIP mode based on the arrangement order of the plurality of MIP modes; and encoding the residual block of the current block and encoding an index of the optimal MIP mode in the coding manner used for the optimal MIP mode, to obtain the bitstream.

12. The method of claim 9, wherein determining, based on the distortion costs corresponding to the plurality of MIP modes, the optimal MIP mode for predicting the current block comprises:

predicting the samples in the template region based on a third flag and the plurality of MIP modes, to obtain distortion costs corresponding to the plurality of MIP modes in each state of the third flag, wherein the third flag indicates whether an input vector and an output vector corresponding to an MIP mode are transposed; and determining the optimal MIP mode based on the distortion costs corresponding to the plurality of MIP modes in each state of the third flag.

13. The method of claim 9, wherein before determining, based on the distortion costs corresponding to the plurality of MIP modes, the optimal MIP mode for predicting the current block, the method further comprises:

obtaining MIP modes used for a neighbouring block adjacent to the current block; and determining the MIP modes used for the neighbouring block as the plurality of MIP modes.

14. The method of claim 9, wherein before determining, based on the distortion costs corresponding to the plurality of MIP modes, the optimal MIP mode for predicting the current block, the method further comprises:

performing reconstructed-sample padding on a reference region adjacent to the template region, to obtain a reference row and a reference column of the template region;

predicting the samples in the template region in the plurality of MIP modes respectively with the reference row and the reference column as inputs, to obtain a plurality of prediction blocks corresponding to the plurality of MIP modes; and determining the distortion costs corresponding to the plurality of MIP modes based on the plurality of prediction blocks and a reconstructed block of the template region.

15. The method of claim 9, wherein determining, based on the distortion costs corresponding to the plurality of MIP modes, the optimal MIP mode for predicting the current block comprises:

determining the optimal MIP mode based on sums of absolute transformed difference (SATD) corresponding to the plurality of MIP modes in the template region.

16. A non-transitory computer-readable storage medium storing a computer program and a bitstream, wherein when executed by a processor, the computer program causes the processor to implement an encoding method to generate the bitstream, the encoding method comprising:

determining, based on distortion costs corresponding to a plurality of matrix based intra prediction (MIP) modes, an optimal MIP mode for predicting a current block, wherein the distortion costs corresponding to the plurality of MIP modes comprise distortion costs obtained by predicting samples in a template region adjacent to the current block in the plurality of MIP modes;

determining the optimal MIP mode as an intra prediction mode of the current block;

predicting the current block in the intra prediction mode of the current block, to obtain a prediction block of the current block;

obtaining a residual block of the current block based on the prediction block of the current block and an original block of the current block; and encoding the residual block of the current block to obtain the bitstream.

* * * * *